(12) United States Patent
Tanase et al.

(10) Patent No.: US 10,491,759 B2
(45) Date of Patent: Nov. 26, 2019

(54) IMAGE PROCESSING DEVICE, PRINTING APPARATUS, IMAGE PROCESSING METHOD, AND NON-TRANSITORY COMPUTER READABLE MEDIUM

(71) Applicant: SEIKO EPSON CORPORATION, Tokyo (JP)

(72) Inventors: Kazuyoshi Tanase, Nagano (JP); Akira Yamada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/024,947

(22) Filed: Jul. 2, 2018

(65) Prior Publication Data

US 2019/0014227 A1 Jan. 10, 2019

(30) Foreign Application Priority Data

Jul. 4, 2017 (JP) .................................. 2017-130885

(51) Int. Cl.
| | |
|---|---|
| *H04N 1/00* | (2006.01) |
| *G06T 7/12* | (2017.01) |
| *H04N 1/50* | (2006.01) |
| *H04N 1/52* | (2006.01) |
| *G06K 9/46* | (2006.01) |
| *B41J 2/21* | (2006.01) |
| *H04N 1/54* | (2006.01) |
| *H04N 1/58* | (2006.01) |

(52) U.S. Cl.
CPC ........ *H04N 1/00167* (2013.01); *B41J 2/2132* (2013.01); *G06K 9/4604* (2013.01); *G06T 7/12* (2017.01); *H04N 1/00188* (2013.01); *H04N 1/502* (2013.01); *H04N 1/52* (2013.01); *H04N 1/54* (2013.01); *H04N 1/58* (2013.01)

(58) Field of Classification Search
CPC ........ H04N 1/00167; H04N 1/58; H04N 1/54; H04N 1/52; H04N 1/00188; H04N 1/502; B41J 2/2132; G06K 9/4604; G06T 7/12
See application file for complete search history.

(56) References Cited

U.S. PATENT DOCUMENTS

| | | | |
|---|---|---|---|
| 6,261,349 B1 | 7/2001 | Nagai et al. | |
| 7,527,345 B2 * | 5/2009 | Fukuda | B41J 2/17566 347/103 |
| 2010/0128288 A1 * | 5/2010 | Karito | H04N 1/58 358/1.8 |
| 2013/0065024 A1 * | 3/2013 | Aruga | B05D 5/02 428/172 |

FOREIGN PATENT DOCUMENTS

JP 10-250216 A 9/1998

\* cited by examiner

*Primary Examiner* — Neil R McLean

(57) ABSTRACT

The disclosure includes an edge extracting unit configured to, based on image data corresponding to a print image, extract edge pixels forming an outline of a partial image, a dot formation specification determining unit configured to, based on the image data, determine dot formation specifications, and a print data generator configured to, based on the dot formation specifications, generate print data for causing execution of printing by a printing apparatus for printing the print image by discharging first ink on a printing medium and second ink that promotes spreading of the first ink on the printing medium to form the plurality of dots.

14 Claims, 16 Drawing Sheets

| 1 | 2 | 3 |
|---|---|---|
| 4 | 0 | 5 |
| 6 | 7 | 8 |

Fig. 9

| 20 | 25  | 30  |
|----|-----|-----|
| 60 | 120 | 130 |
| 15 | 130 | 135 |

Fig. 10

IMAGE PROCESSING DEVICE, PRINTING APPARATUS, IMAGE PROCESSING METHOD, AND NON-TRANSITORY COMPUTER READABLE MEDIUM

BACKGROUND

1. Technical Field

The disclosure relates to an image processing device, a printing apparatus including the image processing device, an image processing method, and a non-transitory computer readable medium storing an image processing program for causing a computer to execute a process in accordance with the image processing method.

2. Related Art

There are cases in which a printing apparatus that prints an image by discharging ink droplets onto a printing medium, such as an ink jet printer, may not achieve good printing quality depending on the specifications of the printing medium due to insufficient wet-spreading of the ink droplets (in other words, due to a dot diameter on the printing medium not being as large as expected). As a method for improving compatibility between this type of printing medium and ink, there is a known method wherein colorless or light-colored clear ink for promoting predetermined wet-spreading or adhesion of ink droplets is applied to a printing medium, and then printing is performed by discharging the ink droplets (e.g., the image recording method disclosed in JP-A-10-250216), for example.

However, in the method disclosed in JP-A-10-250216, although the print image is a good print image overall, there are cases where characters, line outline, etc. in the print image are disordered. Specifically, in a case in which, prior to printing (namely, before discharging the ink droplets for forming the print image) or at the same time as printing, colorless clear ink having affinity to ink is applied at a prescribed dot density so that the ink droplets have a predetermined wet-spread, differences may occur in the direction in which the dots to be formed spread, in the sizes of the dots, etc. depending on the positional relationship between the landing position of the ink droplets and the clear ink dots, thus resulting in disordering of the characters, line outline, or the like.

SUMMARY

The disclosure can be realized as the following application examples or exemplary embodiments.

Application Example 1

An image processing device according to Application Example 1 includes: an edge extracting unit configured to, based on image data corresponding to a print image, extract edge pixels forming an outline of a partial image contained in the print image, a dot formation specification determining unit configured to, based on the image data, determine dot formation specifications including positions at which a plurality of dots are to be formed and sizes of the plurality of dots, and a print data generator configured to, based on the dot formation specifications, generate print data for causing execution of printing by a printing apparatus for printing the print image by discharging first ink on a printing medium and second ink that promotes spreading of the first ink on the printing medium to form the plurality of dots. The dot formation specification determining unit determines the dot formation specifications such that an application density of the second ink discharged on a first pixel region, including pixel positions adjacent to an outer side of the edge pixels and pixel positions overlapping the edge pixels extracted by the edge extracting unit, is less than an application density of the second ink discharged on a second pixel region contacting the first pixel region.

The image processing device of Application Example 1 generates the print data based on the image data corresponding to the print image, the print data being for causing execution of printing by a printing apparatus for printing the print image by discharging the first ink on the printing medium and the second ink that promotes the spreading of the first ink on the printing medium to form the plurality of dots. Furthermore, the image processing device includes the edge extracting unit that, based on the image data, extracts edge pixels forming the outline of the partial image contained in the print image, the dot formation specification determining unit that, based on the image data, determines the positions at which the dots are to be formed and the sizes of the dots, and a print data generator that generates print data based on the dot formation specifications. The dot formation specification determining unit determines the dot formation specifications such that the application density of the second ink discharged on the first pixel region, including the pixel positions adjacent to the outer side of the edge pixels and the pixel positions overlapping the edge pixels extracted by the edge extracting unit, is less than the application density of the second ink discharged on the second pixel region contacting the first pixel region.

The first pixel region is a region where the dots (ink droplets) of the first ink forming the outline of the partial image contained in the print image contact the dots (ink droplets) of the second ink, or a region where the rate of such contact is high. In the present application example, print data is generated such that the application density of the second ink in the first pixel region is reduced. Thus, even in a case in which the dots (ink droplets) of the first ink and the dots (ink droplets) of the second ink contact each other, the degree to which the dots (ink droplets) of the first ink are affected by the dots (ink droplets) of the second ink is reduced (namely, the degree to which the dots (ink droplets) spread is reduced). This results in an even lower degree of the outline of the partial image contained in the print image being disordered.

Meanwhile, the second pixel region is a region contacting the first pixel region, or namely, a region outside the pixel region in which the edge pixels forming the outline of the partial image contained in the print image are contained. For this second pixel region, there is no print data generated which reduces the application density of the second ink. Accordingly, spreading of the dots (ink droplets) of the first ink is promoted by the predetermined effects of the second ink in contact with the dots (ink droplets) of the first ink, thus forming a favorable image (predetermined image).

In other words, in Application Example 1, in the region outside the pixel region in which the edge pixels forming the outline of the partial image contained in the print image are contained, the first ink is wet-spread by the predetermined effects of the second ink, thus forming a favorable image, while in the edge pixels forming the outline of the partial image, the degree to which the dots (ink droplets) of the first ink spread is reduced, thus forming a favorable image (partial image) in which disordering of the outline is suppressed. As a result, even in a case where the print image contains, as a partial image, a small character or fine line, for example, it is possible to perform printing with better visibility.

Application Example 2

In the image processing device according to Application Example 1, the dot formation specification determining unit may include a halftone processing unit configured to convert pixel data of a predetermined number of gradations contained in the image data, and pixel data of a predetermined number of gradations corresponding to application of the second ink, into halftone data of a lower number of gradations than the predetermined number of gradations of the dot formation specifications, and the dot formation specification determining unit, among the halftone data corresponding to the second ink, may perform conversion to reduce the application density on the halftone data corresponding to the first pixel region.

In Application Example 2, the dot formation specification determining unit includes a halftone processing unit that converts the pixel data of the predetermined number of gradations contained in the image data, and the pixel data of the predetermined number of gradations corresponding to the application of the second ink, into halftone data of a lower number of gradations than the predetermined number of gradations of the dot formation specifications. Furthermore, among the halftone data corresponding to the second ink (in other words, the halftone data determining the formation positions and sizes of the second ink dots discharged by the printing apparatus), the dot formation specification determining unit performs conversion on the halftone data corresponding to the first pixel region to reduce application density.

In other words, in Application Example 2, print data is generated such that the application density of the second ink in the first pixel region is reduced. Thus, even in a case in which the dots (ink droplets) of the first ink forming the outline of the partial image contained in the print image and the dots (ink droplets) of the second ink contact each other, the degree to which the dots (ink droplets) of the first ink are affected by the dots (ink droplets) of the second ink is reduced (namely, the degree to which the dots (ink droplets) spread is reduced). This results in an even lower degree of the outline of the partial image contained in the print image being disordered. Furthermore, conversion for reducing application density is performed on the halftone data of the second ink corresponding to the pixels of the first pixel region, or in other words, conversion for reducing the density at which the dots of the second ink are actually applied, is performed on the dot formation specifications, and therefore it is possible to generate print data that provides more reliable and suitable effects.

Application Example 3

In the image processing device according to the aforementioned application example, the dot formation specification determining unit may determine a degree to which the application density is reduced based on the halftone data of the first ink corresponding to the edge pixels.

In Application Example 3, the dot formation specification determining unit determines the degree to which the application density of the second ink applied on the first pixel region is reduced based on the halftone data of the first ink corresponding to the edge pixels. As a result, it is possible to more suitably reduce a degree to which the dots (ink droplets) of the first ink are affected by the dots (ink droplets) of the second ink.

Application Example 4

In the image processing device according to the aforementioned application example, the dot formation specification determining unit may include a halftone processing unit that converts pixel data of a predetermined number of gradations contained in the image data, and pixel data of a predetermined number of gradations corresponding to application of the second ink, into halftone data of a lower number of gradations than the predetermined number of gradations of the dot formation specifications, and the dot formation specification determining unit, among the pixel data of the predetermined number of gradations corresponding to the application of the second ink, may perform conversion to reduce the application density on the pixel data corresponding to the first pixel region.

In Application Example 4, among the pixel data of the predetermined number of gradations corresponding to the application of the second ink, the dot formation specification determining unit performs conversion to reduce application density on pixel data corresponding to the first pixel region. Even with such a method, or in other words, even with a method performed before the pixel data of the predetermined number of gradations corresponding to the application of the second ink is converted to halftone data of a lower number of gradations than the predetermined number of gradations of the dot formation specifications, the print data is still generated such that the density at which the second ink is applied on the first pixel region is reduced. Thus, even in a case in which the dots (ink droplets) of the first ink forming the outline of the partial image contained in the print image and the dots (ink droplets) of the second ink contact each other, the degree to which the dots (ink droplets) of the first ink are affected by the dots (ink droplets) of the second ink is reduced. This results in an even lower degree of the outline of the partial image contained in the print image being disordered.

Application Example 5

In the image processing device according to the aforementioned application example, the dot formation specification determining unit may include a halftone processing unit that converts pixel data of a predetermined number of gradations contained in the image data, and pixel data of a predetermined number of gradations corresponding to application of the second ink, into halftone data of a lower number of gradations than the predetermined number of gradations of the dot formation specifications, and the dot formation specification determining unit, among the halftone data corresponding to the second ink, may convert the halftone data corresponding to the first pixel region into data that does not form the dots.

In Application Example 5, among the halftone data corresponding to the second ink (in other words, the halftone data determining the formation positions and sizes of the second ink dots discharged by the printing apparatus), the dot formation specification determining unit converts the halftone data corresponding to the first pixel region to data that does not form dots. In other words, in the present application example, the print data is generated such that the printing apparatus is controlled so as not to discharge the second ink on the first pixel region (a region where the dots (ink droplets) of the first ink forming the outline of the partial image contained in the print image contact the dots (ink droplets) of the second ink, or a region where the rate of such contact is high). Thus, the dots (ink droplets) of the first ink forming the outline of the partial image contained in the print image will not contact the dots (ink droplets) of the second ink. Alternatively, the rate of such contact will be low. This results in an even lower degree of the outline of the partial image contained in the print image being disordered. Furthermore, the halftone data of the second ink corresponding to the pixels of the first pixel region is converted into data that does not form dots, or in other words, the data of the dot formation specifications for forming the dots where second ink is actually to be formed is converted into a specification whereby dots are not formed, and therefore it is possible to generate print data that provides more reliable and suitable effects.

Application Example 6

In the image processing device according to the aforementioned application example, the dot formation specification determining unit may include a halftone processing unit that converts pixel data of a predetermined number of gradations contained in the image data, and pixel data of a predetermined number of gradations corresponding to application of the second ink, into halftone data of a lower number of gradations than the predetermined number of gradations of the dot formation specifications, and the dot formation specification determining unit, among the pixel data of the predetermined number of gradations corresponding to the second ink, may convert the pixel data corresponding to the first pixel region into data that does not form the dots.

In Application Example 6, among the pixel data of the predetermined number of gradations corresponding to the application of the second ink, the dot formation specification determining unit converts pixel data corresponding to the first pixel region into data that does not form dots. Even with such a method, or in other words, even with a method performed before the pixel data of the predetermined number of gradations corresponding to the application of the second ink is converted to halftone data of a lower number of gradations than the predetermined number of gradations of the dot formation specifications, the print data is still generated such that the printing apparatus is controlled so as not to discharge the second ink in the first pixel region (a region where the dots (ink droplets) of the first ink forming the outline of the partial image contained in the print image contact the dots (ink droplets) of the second ink, or a region where the rate of such contact is high). Thus, the dots (ink droplets) of the first ink forming the outline of the partial image contained in the print image will not contact the dots (ink droplets) of the second ink. Alternatively, the rate of such contact will be low. This results in an even lower degree of the outline of the partial image contained in the print image being disordered.

Application Example 7

A printing apparatus according to Application Example 7 may include the image processing device of the aforementioned application example.

In Application Example 7, the printing apparatus includes the image processing device of the aforementioned application example, and thus a favorable image is formed in which disordering of the outline of the partial image contained in the print image is suppressed. For example, even in a case where the print image contains, as a partial image, a small character or fine line, for example, it is possible to perform printing with better visibility.

Application Example 8

An image processing method according to Application Example 8 includes: extracting, based on image data corresponding to a print image, edge pixels forming an outline of a partial image contained in the print image, determining, based on the image data, dot formation specifications including positions at which the dots are to be formed and sizes of the dots, and generating, based on the dot formation specifications, print data for causing execution of printing by a printing apparatus for printing the print image by discharging first ink on a printing medium and second ink that promotes spreading of the first ink on the printing medium to form the plurality of dots. The determining determines the dot formation specifications such that an application density of the second ink discharged on a first pixel region, including pixel positions adjacent to an outer side of the edge pixels and pixel positions overlapping the edge pixels extracted by the edge extracting, is less than an application density of the second ink discharged on a second pixel region contacting the first pixel region.

The image processing method of Application Example 8 generates the print data based on the image data corresponding to the print image, the print data being for causing execution of printing by a printing apparatus for printing the print image by discharging the first ink on the printing medium and the second ink that promotes the spreading of the first ink on the printing medium to form the plurality of dots. The image processing method also includes extracting, based on the image data, edge pixels forming the outline of the partial image contained in the print image, determining, based on the image data, the positions at which the dots are to be formed and the sizes of the dots, and generating print data based on the dot formation specifications. The determining determines the dot formation specifications such that the application density of the second ink discharged on the first pixel region, including the pixel positions adjacent to the outer side of the edge pixels and pixel positions overlapping the edge pixels extracted by the edge extracting unit, is less than the application density of the second ink discharged on the second pixel region contacting the first pixel region.

In Application Example 8, the print data was generated such that the application density of the second ink in the first pixel region is reduced, and thus, even in a case in which the dots (ink droplets) of the first ink and the dots (ink droplets) of the second ink contact each other, the degree to which the dots (ink droplets) of the first ink are affected by the dots (ink droplets) of the second ink is reduced (namely, the degree to which the dots (ink droplets) spread is reduced). This results in an even lower degree of the outline of the partial image contained in the print image being disordered.

Meanwhile, there is no print data generated which reduces the application density of the second ink, and thus, the dots (ink droplets) of the first ink have the spreading promoted by the predetermined effects of the second ink in contact with the dots (ink droplets) of the first ink, forming a favorable image (predetermined image).

In other words, in Application Example 8, in the region outside the pixel region in which the edge pixels forming the outline of the partial image contained in the print image are contained, the first ink is wet-spread by the predetermined effects of the second ink, thus forming a favorable image, while in the edge pixels forming the outline of the partial image, the degree to which the dots (ink droplets) of the first ink spread is reduced, forming a favorable image (partial image) in which disordering of the outline has been suppressed. As a result, even in the case where the print image contains, as a partial image, a small character or fine line, for example, it is possible to perform printing with better visibility.

Application Example 9

In the image processing method according to the aforementioned application example, the determining may include converting pixel data of a predetermined number of gradations contained in the image data, and pixel data of a predetermined number of gradations corresponding to application of the second ink, into halftone data of a lower number of gradations than the predetermined number of gradations of the dot formation specifications, and the determining, among the halftone data corresponding to the second ink, may perform conversion to reduce the application density on the halftone data corresponding to the first pixel region.

In Application Example 9, the determining includes a halftone processing that converts the pixel data of the predetermined number of gradations contained in the image data, and the pixel data of the predetermined number of gradations corresponding to the application of the second ink, into halftone data of a lower number of gradations than the predetermined number of gradations of the dot formation specifications. Furthermore, among the halftone data corresponding to the second ink, the determining performs conversion to reduce application density on the halftone data corresponding to the first pixel region.

In other words, in the present application example, print data is generated such that the application density of the second ink in the first pixel region is reduced. Thus, even in a case in which the dots (ink droplets) of the first ink forming the outline of the partial image contained in the print image and the dots (ink droplets) of the second ink contact each other, the degree to which the dots (ink droplets) of the first ink are affected by the dots (ink droplets) of the second ink is reduced (namely, the degree to which the dots (ink droplets) spread is reduced). This results in an even lower degree of the outline of the partial image contained in the print image being disordered. Furthermore, conversion for reducing application density is performed on the halftone data of the second ink corresponding to the pixels of the first pixel region, or in other words, conversion for reducing the density at which the dots of the second ink are actually applied is performed on the dot formation specifications, and therefore it is possible to generate print data that provides more reliable and suitable effects.

Application Example 10

In the image processing method according to the aforementioned application example, the determining may determine a degree to which the application density is reduced based on the halftone data of the first ink corresponding to the edge pixels.

In Application Example 10, the determining determines the degree to which the application density of the second ink applied on the first pixel region is reduced based on the halftone data of the first ink corresponding to the edge pixels. As a result, it is possible to have a more suitable degree of reducing the dots (ink droplets) of first ink from being affected by the dots (ink droplets) of the second ink.

Application Example 11

In the image processing method according to the aforementioned application example, the determining may include converting pixel data of a predetermined number of gradations contained in the image data, and pixel data of a predetermined number of gradations corresponding to application of the second ink, into halftone data of a lower number of gradations than the predetermined number of gradations of the dot formation specifications, and the determining, among the pixel data of the predetermined number of gradations corresponding to the application of the second ink, may perform conversion to reduce the application density on the pixel data corresponding to the first pixel region.

In Application Example 11, among the pixel data of the predetermined number of gradations corresponding to the application of the second ink, the determining performs conversion to reduce application density on pixel data corresponding to the first pixel region. Even with such a method, or in other words, even with a method performed before the pixel data of the predetermined number of gradations corresponding to the application of the second ink is converted to halftone data of a lower number of gradations than the predetermined number of gradations of the dot formation specifications, the print data is still generated such that the density at which the second ink is applied on the first pixel region is reduced. Thus, even in a case in which the dots (ink droplets) of the first ink forming the outline of the partial image contained in the print image and the dots (ink droplets) of the second ink contact each other, the degree to which the dots (ink droplets) of the first ink are affected by the dots (ink droplets) of the second ink is reduced. This results in an even lower degree of the outline of the partial image contained in the print image being disordered.

Application Example 12

In the image processing method according to the aforementioned application example, the determining may include converting pixel data of a predetermined number of gradations contained in the image data, and pixel data of a predetermined number of gradations corresponding to application of the second ink, into halftone data of a lower number of gradations than the predetermined number of gradations of the dot formation specifications, and the determining, among the halftone data corresponding to the second ink, may convert the halftone data corresponding to the first pixel region into data that does not form the dots.

In Application Example 12, among the halftone data corresponding to the second ink (in other words, the halftone data determining the formation positions and sizes of the second ink dots discharged by the printing apparatus), the determining converts the halftone data corresponding to the first pixel region to data that does not form dots. In other words, in the present application example, the print data is generated such that the printing apparatus is controlled so as not to discharge the second ink on the first pixel region (a region where the dots (ink droplets) of the first ink forming the outline of the partial image contained in the print image contact the dots (ink droplets) of the second ink, or a region where the rate of such contact is high). Thus, the dots (ink droplets) of the first ink forming the outline of the partial image contained in the print image will not contact the dots (ink droplets) of the second ink. Alternatively, the rate of such contact will be low. This results in an even lower degree of the outline of the partial image contained in the print image being disordered. Furthermore, the halftone data of the second ink corresponding to the pixels of the first pixel region is converted into data that does not form dots, or in other words, the data of the dot formation specifications for forming the dots where second is actually to be formed is converted into a specification whereby dots are not formed, and therefore it is possible to generate print data that provides more reliable and suitable effects.

Application Example 13

In the image processing according to the aforementioned application example, the determining may include converting pixel data of a predetermined number of gradations contained in the image data, and pixel data of a predetermined number of gradations corresponding to application of the second ink, into halftone data of a lower number of gradations than the predetermined number of gradations of the dot formation specifications, and the determining, among the pixel data of the predetermined number of gradations corresponding to the application of the second ink, may convert the pixel data corresponding to the first pixel region into data that does not form the dots.

In Application Example 13, among the pixel data of the predetermined number of gradations corresponding to the application of the second ink, the dot formation specification determining unit converts pixel data corresponding to the first pixel region into data that does not form dots. Even with such a method, or in other words, even with a method performed before the pixel data of the predetermined number of gradations corresponding to the application of the second ink is converted to halftone data of a lower number of gradations than the predetermined number of gradations of the dot formation specifications, the print data is still generated such that the printing apparatus is controlled so as not to discharge the second ink in the first pixel region (a region where the dots (ink droplets) of the first ink forming the outline of the partial image contained in the print image contact the dots (ink droplets) of the second ink, or a region where the rate of such contact is high). Thus, the dots (ink droplets) of the first ink forming the outline of the partial image contained in the print image will not contact the dots (ink droplets) of the second ink. Alternatively, the rate of such contact will be low. This results in an even lower degree of the outline of the partial image contained in the print image being disordered.

Application Example 14

A non-transitory computer readable medium storing an image processing program of the present application example may enable execution of a process for generating the print data in the image processing data that generates print data described in the aforementioned application example.

In Application Example 14, print data can be generated for causing execution of printing by a printing apparatus for printing the print image by discharging the first ink on the printing medium and the second ink that promotes the spreading of the first ink on the printing medium to form the plurality of dots, such that the degree, to which the outline of the partial image contained in the print image is disordered, is reduced.

Application Example 15

A non-transitory computer readable medium storing an image processing program of the present application example may enable execution of a process for generating the print data in the image processing method that generates print data described in the aforementioned application example.

In the present application example, print data can be generated for causing execution of printing by a printing apparatus for printing the print image by discharging the first ink on the printing medium and the second ink that promotes the spreading of the first ink on the printing medium to form the plurality of dots, such that the degree, to which the outline of the partial image contained in the print image is disordered, is reduced.

BRIEF DESCRIPTION OF THE DRAWINGS

The disclosure will be described with reference to the accompanying drawings, wherein like numbers reference like elements.

FIG. 9 is a matrix illustrating calculation target pixels when performing the edge extracting process for each channel.

FIG. 10 is a matrix illustrating an example of gradation values of the calculation target pixels.

DESCRIPTION OF EXEMPLARY EMBODIMENTS

Hereinafter, some exemplary embodiments in which the disclosure is realized will be described with reference to the accompanying drawings. The following is one aforementioned application example of the disclosure and does not limit the disclosure. Note that, in each diagram below, elements may be illustrated on a scale that differs from actuality for ease of explanation. Furthermore, in the coordinates affixed to the drawings, the Z-axis direction denotes an up-down direction, the +Z direction denotes an up direction, the X-axis direction denotes a front-back direction, the −X direction denotes a back direction, the Y-axis direction denotes a left-right direction, the +Y direction denotes a left direction, and the X-Y plane denotes a horizontal plane.

Exemplary Embodiment 1

Figure 1:
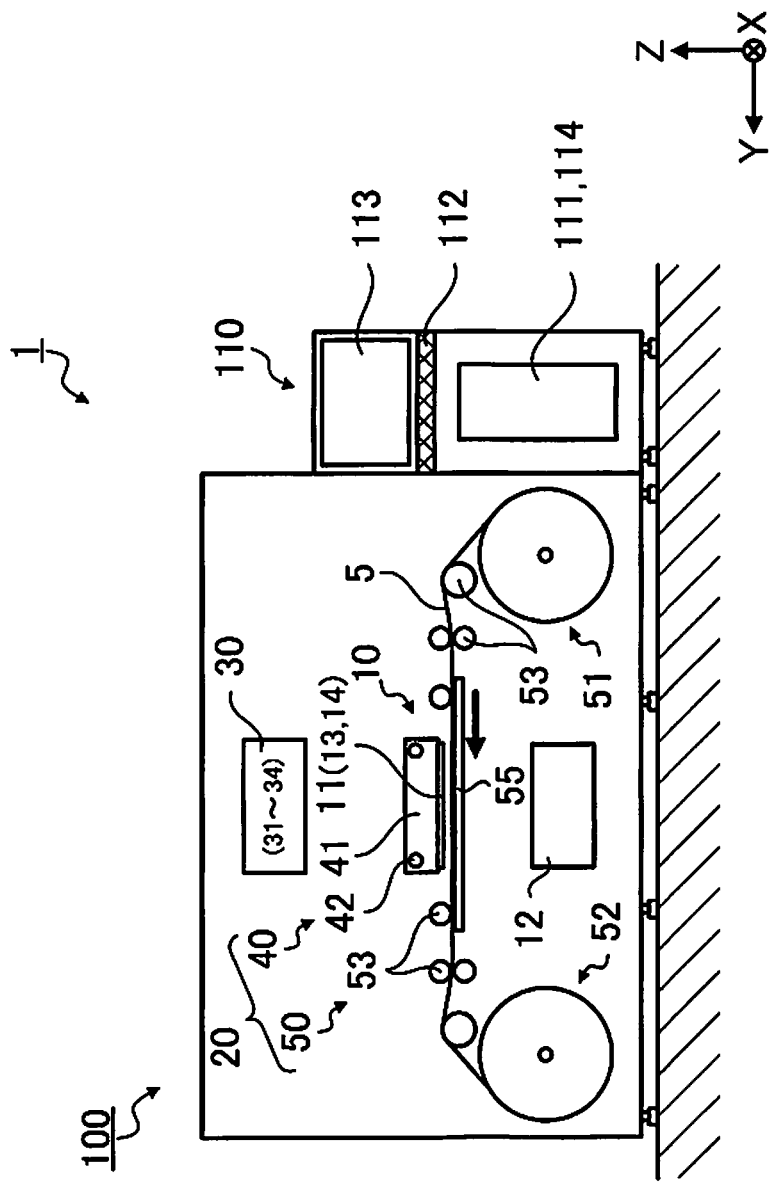
FIG. 1 is a front view of the configuration of a printing apparatus according to Exemplary Embodiment 1
Figure 2:
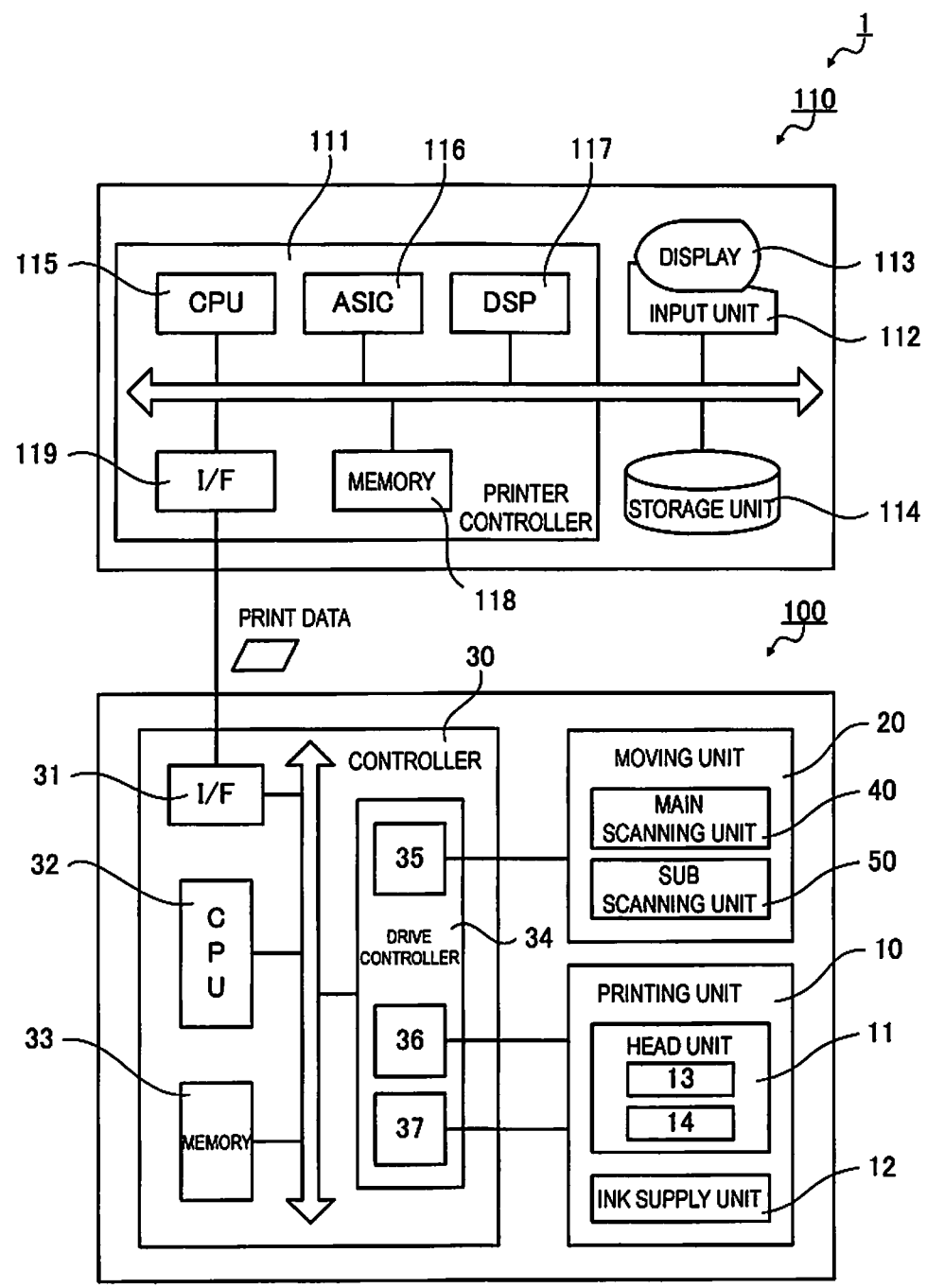
FIG. 2 is a block diagram of the configuration of the printing apparatus according to Exemplary Embodiment 1.

FIG. 1 is a front view illustrating the configuration of a printing apparatus 1 according to Exemplary Embodiment 1, and FIG. 2 is a block diagram of the configuration of the printing apparatus 1 according to Exemplary Embodiment 1. The printing apparatus 1 includes a printer 100, and an image processing device 110 that connects to the printer 100. The printer 100 is an ink jet printer that, based on print data received from the image processing device 110, prints a desired image on a roll paper 5, which is a long "printing medium" supplied while wound in a roll shape.

Basic Configuration of Image Processing Device

The image processing device 110 includes a printer controller 111, an input unit 112, a display 113, a storage unit 114, etc., and controls a print job that causes the printer 100 to print. The image processing device 110, in one example, is configured using a personal computer. The software operated by the image processing device 110 includes an ordinary image processing application for handling image data to be printed (hereinafter also referred to as the application), printer driver software that generates print data for controlling the printer 100 or causing the printer 100 to print (hereinafter also referred to as the printer driver), etc. The printer driver is the "image processing program" in the disclosure. In other words, the image processing device 110 controls the printer 100 through print data for causing the printer 100 to print a print image that is based on image data. The printer driver is not limited to the example of being configured as a software-based functional unit, and may be configured as a firmware-based functional unit, for example. The firmware is in the image processing device 110 implemented in a SOC (system on chip), for example.

The printer controller 111 is provided with a CPU 115, ASIC 116, DSP 117, memory 118, printer interface unit (I/F) 119, etc., and performs centralized management of the entire printing apparatus 1. The input unit 112 is an information input unit that is a human interface. Specifically, the input unit is a port or the like to which a keyboard or information input machine connects, for example. The display 113 is an information display (display) that is a human interface, and displays, based on control by the printer controller 111, information input from the input unit 112, an image to be printed in the printer 100, information about a print job, or the like. The storage unit 114 is a rewritable storage medium such as a hard disk drive (HDD) or memory card, and stores software operated by the image processing device 110 (programs operated by the printer controller 111), an image to be printed, information about a print job, or the like. The memory 118 is a storage medium that secures an area for storing the programs operated by the CPU 115, a work area for operating, etc., and is configured by a storage element such as a RAM or EEPROM.

Basic Configuration of Printer 100

The printer 100 includes a printing unit 10, moving unit 20, controller 30, etc. The printer 100, after receiving print data from the image processing device 110, controls the printing unit 10 and moving unit 20 via the controller 30, and prints an image (forms an image) on the roll paper 5. The print data is image forming data that has undergone a conversion process so as to be printable by the printer 100 via the application and printer driver of the image processing device 110, and contains a command for controlling the printer 100. The image data contains ordinary full-color image information, text information, etc. obtained by a digital camera or the like, for example.

The printing unit 10 includes a head unit 11, ink supply unit 12, etc. The moving unit 20 includes a main scanning unit 40, a sub scanning unit 50, etc. The main scanning unit 40 includes a cartridge 41, a guide shaft 42, a cartridge motor (not illustrated), etc. The sub scanning unit 50 includes a supply unit 51, a storage unit 52, conveyance rollers 53, a platen 55, etc.

The head unit 11 includes a print head 13 having a plurality of nozzles (nozzle group) that discharge printing ink (hereinafter referred to as ink) as ink droplets, and a head controller 14. The head unit 11 is mounted on the cartridge 41 and moves back and forth in the main scanning direction (the X-axis direction illustrated in FIG. 1) in conjunction with the cartridge 41 moving in the main scanning direction. The head unit 11 (print head 13), while moving in the main scanning direction, is controlled by the controller 30 and discharges ink droplets on the roll paper 5 supported by the platen 55, thus forming a column of dots (a raster line) along the main scanning direction on the roll paper 5.

The ink supply unit 12 is provided with an ink tank, an ink supply path (not illustrated) that supplies ink from the ink tank to the print head 13, etc. The ink tank, ink supply path, and the ink supply path to the nozzles discharging identical ink are provided independently for each ink.

The ink is, for example, a color ink set including a dark ink composition, such as a four-color ink set in which black (K) has been added to a three-color ink set of cyan (C), magenta (M), and yellow (Y). Furthermore, the ink set could be an eight-color ink set to which has been added an ink set of a light ink composition in which the concentration of each color material has been lightened, such as light cyan (Lc), light magenta (Lm), light yellow (Ly), and light black (Lk), for example. The color ink of these color ink sets is a "first ink" in the disclosure.

The ink used by the printer 100 also includes, in addition to these color ink sets for color printing, a clear ink (CL) for improving printing quality. Clear ink (CL) is a transparent ink that has affinity with color ink, and promotes the spreading of the color ink (first ink) applied to the roll paper 5. In other words, the clear ink is a "second ink" in the disclosure. For example, when the roll paper 5 is a printing medium with low permeability of color ink on the surface and a low degree of wet-spreading of dots, there are cases in which the gaps between the color ink dots become visible, and as a result unevenness in printing (the banding of each pass operation of printing (described later)) becomes visible. In contrast, performing printing while discharging the clear ink (CL) that has affinity with the color ink on the roll paper 5 before the discharge of the color ink or at the same time as the discharge of the color ink causes the ink droplets formed by the color ink to contact the clear ink (CL), thus making it possible to perform control such that the dot diameter is large. The application specifications (the size of the ink droplets, ink droplet discharge density, etc.) of the clear ink (CL) may be determined in advance under sufficient evaluation so as to be a suitable specification corresponding to the specifications of each roll paper 5.

The method (ink jet method) by which the ink droplets are discharged is a piezo method. In the piezo method, a piezoelectric element (piezo element) applies a voltage corresponding to a print information signal to ink stored in a pressure chamber, and ink droplets are jetted (discharged) from the nozzle communicating with the pressure chamber, thus performing printing. The method by which the ink droplets are discharged is not limited to this, and a different printing method may be used in which ink is jetted in liquid droplet form to form a group of dots on a printing medium. For example, the method may be a method whereby a strong electric field between a nozzle and an acceleration electrode placed in front of the nozzle causes ink to be sequentially jetted in a liquid droplet form from the nozzle and then a print information signal is applied from a deflection electrode while the ink droplets are flying, thus performing printing, or a method (electrostatic suction method) whereby the ink droplets are not deflected but rather jetted in accordance with the print information signal, or a method whereby a compact pump applies pressure to the ink, and the nozzle is caused to mechanically oscillate via a crystal resonator or the like, thus forcibly causing the ink droplets to be jetted, or a method (thermal jet method) whereby ink is heated and foamed with micro-electrodes in accordance with a print information signal and then the ink droplets are jetted, thus performing printing.

The moving unit 20 (main scanning unit 40, sub scanning unit 50), under control of the controller 30, causes the roll paper 5 to move relative to the head unit 11 (print head 13). The guide shaft 42 extends in the main scanning direction and slidably supports the cartridge 41, and the cartridge motor serves as the driving source when the cartridge 41 is being moved back and forth along the guide shaft 42. In other words, the main scanning unit 40 (cartridge 41, guide shaft 42, cartridge motor), under control of the controller 30, moves the cartridge 41 (or namely, the print head 13) in the main scanning direction along the guide shaft 42.

The supply unit 51 rotatably supports a reel around which the roll paper 5 has been wound in a rolled shape and feeds the roll paper 5 to a conveyance path. The storage unit 52 rotatably supports a reel for rewinding the roll paper 5, and rewinds the roll paper 5 for which printing has been completed from the conveyance path. The conveyance rollers 53 include a driving roller that moves the roll paper 5 in a sub scanning direction (the Y-axis direction illustrated in FIG. 1) intersecting the main scanning direction, a driven roller that rotates in conjunction with the movement of the roll paper 5, etc., and the conveyance rollers form a conveyance path in which the roll paper 5 is conveyed from the supply unit 51 to the storage unit 52 via a printing region of the printing unit 10 (a region where the print head 13 moves in the main scanning direction on the upper surface of the platen 55).

The controller 30 is provided with an interface unit (I/F) 31, a CPU 32, a memory 33, a drive controller 34, etc., and controls the printer 100. The interface unit 31 connects to the printer interface unit 119 of the image processing device 110 and performs data transmission/reception between the image processing device 110 and the printer 100. The image processing device 110 and the printer 100 may be directly connected by a cable or the like, or indirectly connected via a network or the like. Furthermore, the data transmission/reception may be performed between the image processing device 110 and the printer 100 via wireless communication.

The CPU 32 is a calculation processing device for controlling the entire printer 100. The memory 33 is a storage medium that secures an area for storing the programs operated by the CPU 32, a work area for operating, etc., and is configured by a storage element such as a RAM or EEPROM. The CPU 32 controls the printing unit 10 and moving unit 20 via the drive controller 34 in accordance with the programs stored in the memory 33 and the print data received from the image processing device 110.

The drive controller 34, based on the control by the CPU 32, controls the driving of the printing unit 10 (head unit 11, ink supply unit 13) and moving unit 20 (main scanning unit 40, sub scanning unit 50). The drive controller 34 includes a movement control signal generation circuit 35, a discharge control signal generation circuit 36, and a drive signal generation circuit 37. The movement control signal generation circuit 35 generates signals for controlling the moving unit 20 (main scanning unit 40, sub scanning unit 50) in accordance with instructions from the CPU 32. The discharge control signal generation circuit 36, based on the print data, generates head control signals for selecting the nozzle to discharge ink, selecting the amount to discharge, controlling the timing of the discharge, etc., in accordance with instructions from the CPU 32. The drive signal generation circuit 37 generates basic drive signals including drive signals for driving the piezoelectric element of the print head 13. The drive controller 34 selectively drives the piezoelectric element respectively corresponding to each nozzle based on the head control signals and the basic drive signals.

Print Head

Figure 3:
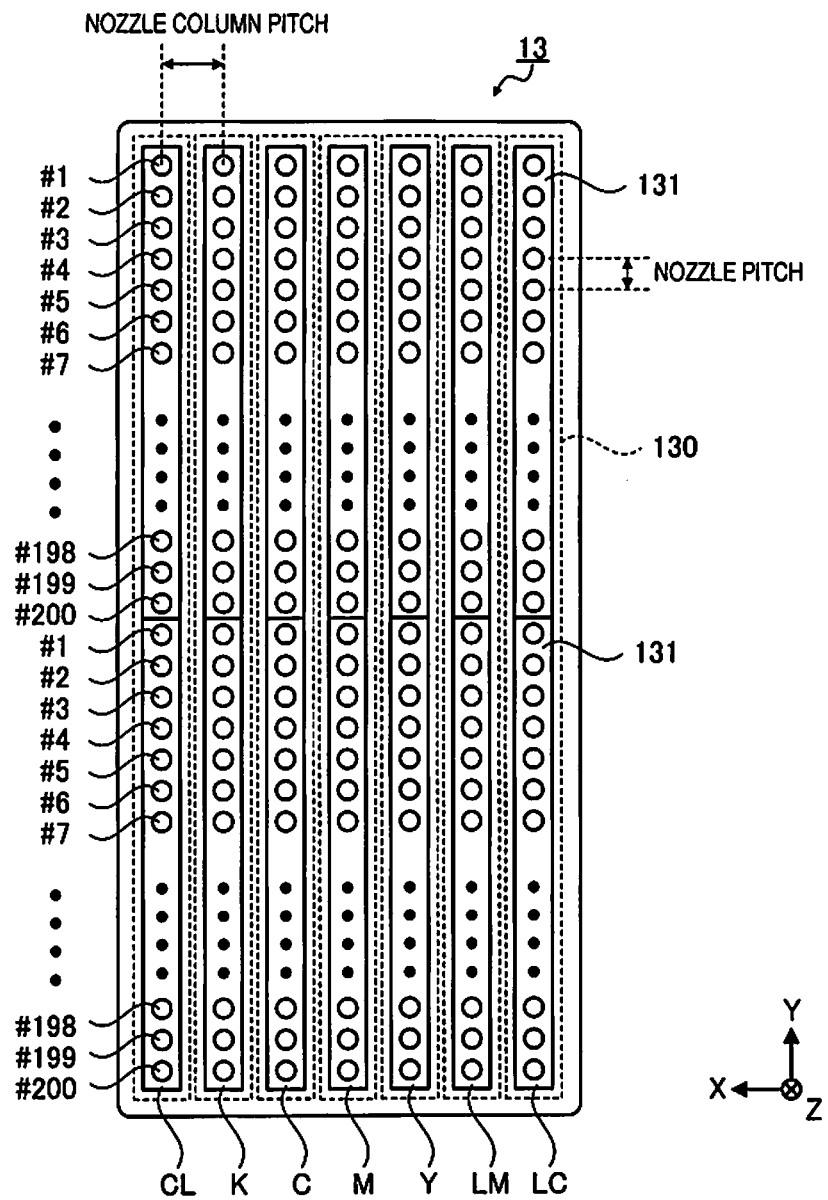
FIG. 3 is a schematic diagram of one example of the arrangement of nozzles of a print head.

FIG. 3 is a schematic diagram of an example of the arrangement of nozzles of the print head 13. FIG. 3 illustrates the print head 13 as seen from the bottom surface. As illustrated in FIG. 3, the print head 13 is provided with seven nozzle columns 130 in which a plurality of nozzles for discharging each ink are formed next to one another at a predetermined nozzle pitch (a clear ink nozzle column CL, black ink nozzle column K, cyan ink nozzle column C, magenta ink nozzle column M, yellow ink nozzle column Y, light magenta ink nozzle column LM, and light cyan ink nozzle column LC). The nozzle columns 130 are aligned next to one another such that the nozzle columns 130 are parallel to one another, with a uniform interval (nozzle column pitch) between the nozzle columns 130 along the direction (X-axis direction) intersecting the sub scanning direction (Y-axis direction).

The nozzle columns 130 each include two nozzle chips 131 extending in the Y-axis direction and continuing from one another, and the nozzle chips 131 each include 200 nozzles of #1 to #200 aligned next to one another such that there is a uniform interval (nozzle pitch) between the nozzles along the sub scanning direction (Y-axis direction). The nozzle chips 131 have a silicon wafer as the basic material, for example, which is manufactured by a MEMS (microelectromechanical systems) manufacturing process to which a semiconductor process has been applied, and the 200 nozzles of each of the nozzle chips 131 form a "nozzle group" that has identical or similar ink discharge characteristics. Furthermore, each of the nozzles is provided with a drive element (the piezoelectric element such as the piezo element described above) for driving the nozzle so as to discharge ink droplets.

Through the configuration described above, the controller 30 repeats a pass operation, in which ink droplets are discharged (applied) from the print head 13 onto the roll paper 5 supplied to the printing region by the sub scanning unit 50 (supply unit 51, conveyance rollers 53) while moving the cartridge 41 supporting the print head 13 in the main scanning direction (X-axis direction) along the guide shaft 42, and a conveyance operation (feed operation), in which the sub scanning unit 50 (conveyance rollers 53) moves (sub scans) the roll paper 5 in the sub scanning direction (Y-axis direction) intersecting the main scanning direction, thus forming (printing) a desired image on the roll paper 5.

Basic Functions of Printer Driver

Figure 4:
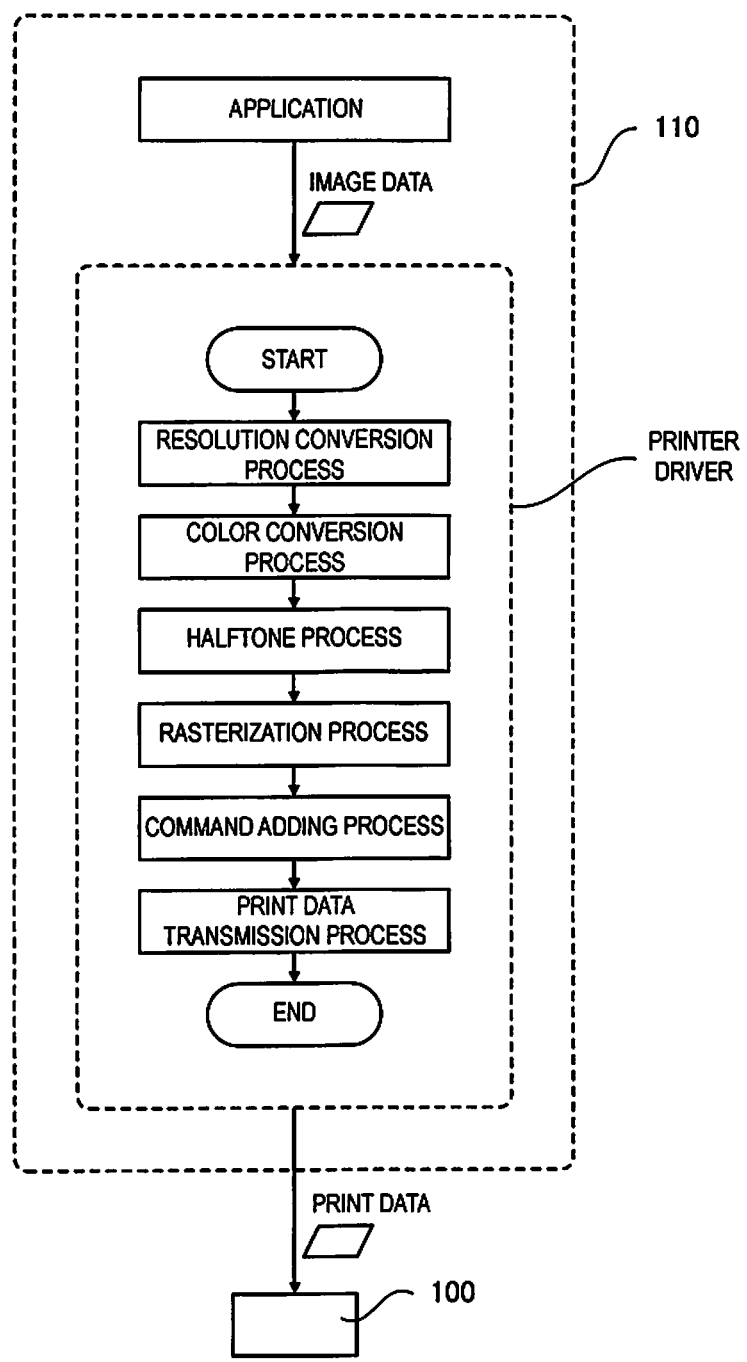
FIG. 4 is a diagram for explaining the basic functions of a printer driver.

FIG. 4 is a diagram for explaining the basic functions of the printer driver. The printing on the roll paper 5 is initiated by print data being transmitted from the image processing device 110 to the printer 100. The print data is generated by the printer driver. The basic content of the generation process for the print data will be described below with reference to FIG. 4.

The printer driver receives image data from the application, converts the image data to print data in a format that can be interpreted by the printer 100, and then outputs the print data to the printer 100. When converting the image data from the application to the print data, the printer driver performs a resolution conversion process, a color conversion process, a halftone process, a rasterization process, a command adding process, and the like.

In other words, the printer driver is provided with, as software-based (or firmware-based) functional units, a resolution conversion processing unit, a color conversion processing unit, a "halftone processing unit", a rasterization processing unit, a command adding processing unit, and the like (not illustrated). The resolution conversion processing unit, the color conversion processing unit, and the halftone processing unit form a "dot formation specification determining unit" that determines, based on the image data, dot formation specifications including the positions at which the dots are to be formed and the sizes of the dots. The dot formation specification determining unit is described later. Furthermore, the rasterization processing unit and the command adding processing unit form a "print data generator" that generates print data based on the dot formation specifications determined by the dot formation specification determining unit. The printer driver (image processing program) performs the processes in each of the functional units via the procedure indicated below.

The resolution conversion process converts the image data output from the application into a resolution (printing resolution) for when printing on the roll paper 5. For example, in a case where the printing resolution is designated as 720×720 dpi, the vector format image data received from the application is converted into bitmap format image data of a 720×720 dpi resolution. After the resolution conversion process, the pixel data in the image data includes pixels arranged in a matrix. Each of the pixels has a gradation value among 256 gradations (a predetermined number of gradations), for example, in an RGB color space. In other words, after the resolution conversion, the pixel data indicates corresponding pixel gradation values. Among the pixels arranged in the matrix, the pixel data corresponding to the amount of pixels in one column aligned in a predetermined direction is called raster data. The predetermined direction in which the pixels corresponding to the raster data are aligned corresponds to the movement direction (main scanning direction) of the print head 13 when printing an image.

The color conversion process converts the RGB data into data in a CMYK color space. The CMYK colors are cyan (C), magenta (M), yellow (Y), and black (K), and the image data in the CMYK color space corresponds to the colors of the ink of the printer 100. Accordingly, when the printer 100 uses ten types of CMYK ink, for example, the printer driver generates image data in a 10-dimensional CMYK color space based on the RGB data. The color conversion process is performed based on a table (color conversion look-up table LUT) in which gradation values of RGB data have been associated with gradation values of CMYK color data. After the color conversion process, the pixel data is CMYK color data of 256 gradations (a predetermined number of gradations), for example, expressed by the CMYK color space.

The halftone process converts the data of 256 gradations (a predetermined number of gradations), for example, into data of the number of gradations that can be formed by the printer 100 (a number of gradations that is lower than the predetermined number of gradations). This halftone process converts the data indicating the 256 gradations, for example, into halftone data that determines the formation specifications of the dots, such as 1-bit data indicating two gradations (dot present or absent), 2-bit data indicating four gradations (dot absent, small dot, medium dot, large dot), or the like, for example. Specifically, the generation rates of the dots corresponding to the gradation values (for example, in the case of four gradations, the generation rate for each of dot absent, small dot, medium dot, and large dot) are found from a dot generation rate table in which the gradation values (0-255) have been associated with the dot generation rates, and a dither method/error diffusion method or the like is used on the obtained generation rates to create pixel data such that the dots are formed in a distributed manner. In this way, in the halftone process, halftone data is generated that determines the formation specifications of the dots formed by the nozzle group discharging ink of the same color (or type). In other words, the halftone data arranged in the matrix indicates the dot formation specifications including the positions at which the dots are to be formed and the sizes of the dots.

The rasterization process rearranges the pixel data arranged in the matrix (the 1-bit, 2-bit, etc. halftone data described above, for example) in accordance with the dot formation order during printing. The rasterization process includes an allocation process in which the image data configured from the halftone-processed pixel data (halftone data) is allocated to the respective pass operations where ink droplets are discharged while the print head 13 (nozzle column) moves in the main scanning direction. When the allocation process is complete, the pixel data arranged in the matrix is allocated in the respective pass operations to the actual nozzles forming the respective raster lines of the print image.

The command adding process adds command data based on the print method to the rasterization-processed data. The command data is, for example, conveyance data relating to conveyance specifications (movement amount, speed, etc. in the sub scanning direction (Y-axis direction)) of the printing medium (roll paper 5). These processes by the printer driver are performed by the ASIC 116 and DSP 117 (refer to FIG. 2) under control of the CPU 115, and the generated print data is transmitted to the printer 100 via the printer interface unit 119 by the print data transmission process.

Outline Maintenance Process

In addition to the basic functions of the printer driver described above, a printer driver in one exemplary embodiment further includes an outline maintenance processing function. It was previously described that, when the roll paper 5 is a printing medium with low permeability of color ink on the surface and a low degree of wet-spreading of dots, applying clear ink (CL) to the roll paper 5 at a predetermined application density promotes the spreading of the color ink. However, there are cases where the change in the color ink dot diameter due to the effects of the clear ink (CL) disorders the characters, line outline, etc. contained in the print image. The outline maintenance process functions to suppress this disordering of the outline, and is configured from functions such as an edge extracting process, a working liquid mask process, etc.

In other words, the printer driver in one exemplary embodiment further includes, as a software-based (or firmware-based) functional unit, an outline maintenance processing unit (refer to FIG. 14, described later). The outline maintenance processing unit is a functional unit in the dot formation specification determining unit, and is configured from an "edge extracting unit", working liquid mask processing unit, etc. (not illustrated). The edge extracting unit is a functional unit that performs an edge extracting process for extracting the outline (edge pixels) of a partial image contained in the print image. Furthermore, the working liquid mask processing unit is a functional unit that determines, from the edge pixels extracted by the edge extracting unit, a target region ("first pixel region", described later) for performing the outline maintenance process, and then changes the application density of the clear ink (CL) for this target region. The outline maintenance processing unit (outline maintenance processing function) will be specifically described below.

Figure 5:
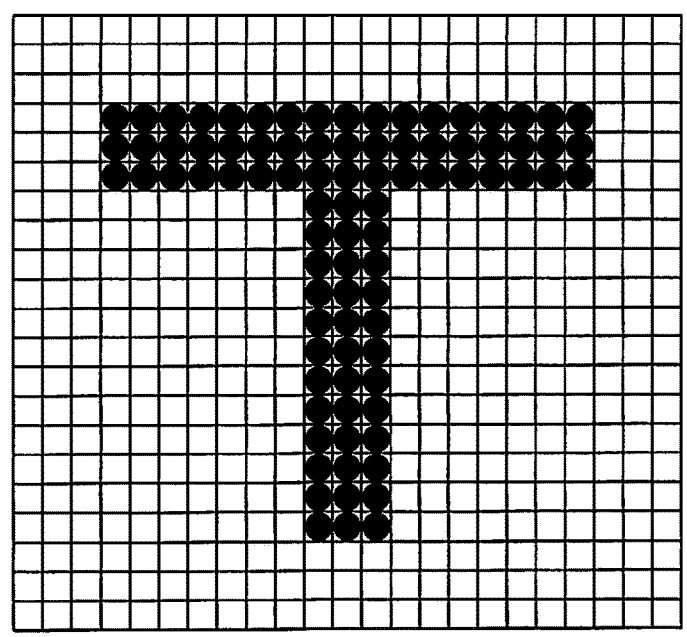
FIG. 5 is a dot matrix illustrating the letter T as an example of a partial image contained in a print image.
Figure 6:
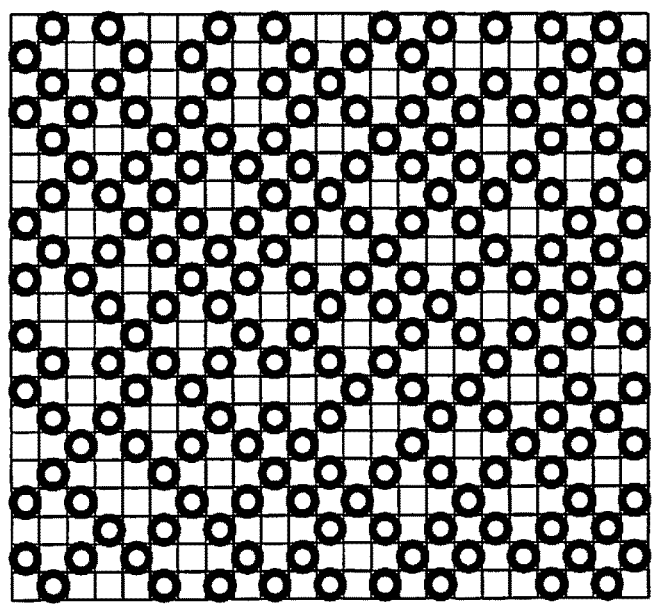
FIG. 6 is a dot matrix illustrating an example of the dot formation positions of clear ink.
Figure 7:
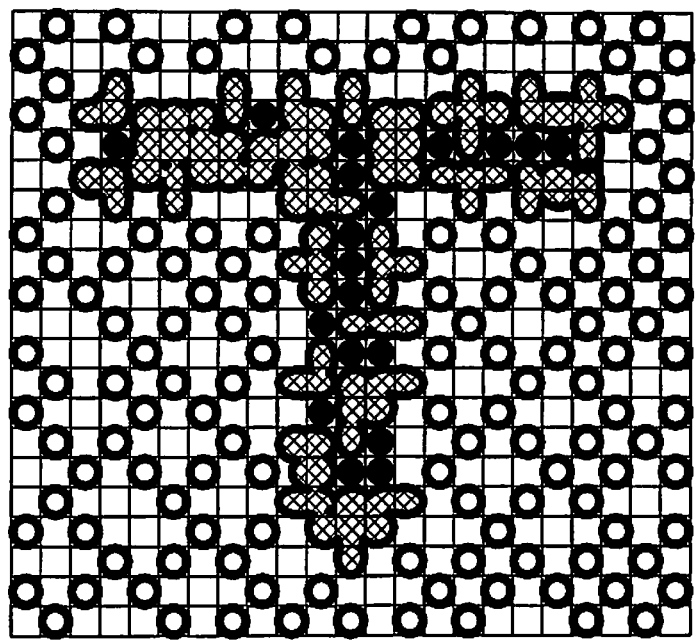
FIG. 7 is a conceptual diagram illustrating an example of a spread of black ink dots.

FIG. 5 is a dot matrix illustrating the letter T as an example of a partial image contained in the print image. The letter T includes a horizontal line of 17×3 dots and a vertical line of 3×12 dots with black ink (K). FIG. 6 is a dot matrix illustrating an example of the dot formation positions of clear ink (CL) discharged at the same time as the letter T. As illustrated by the white circles in FIG. 6, the clear ink (CL) is discharged at random positions at a predetermined discharge density. FIG. 7 is a conceptual diagram illustrating an example of the appearance when the ink droplets (dots) of the black ink (K) and the ink droplets (dots) of the clear ink (CL) contact one another, thus spreading the black ink (K) dots. In FIG. 7, the black ink (K) dots that have been spread by the effects of the clear ink (CL) are illustrated by hatching.

As illustrated in FIG. 7, when the print image including the letter T, which is the partial image, is printed with black ink (K) and clear ink (CL), the effects of the clear ink (CL) improve the wet-spreading characteristics of the black ink (K), but the outline of the letter T is disordered.

Edge Extracting Process

The edge extracting process extracts the edge pixels forming the outline of the partial image contained in the print image based on the image data. A partial image is a letter, line, etc. contained in the print image. In other words, the edge pixels and image surrounded by the edge pixels extracted by the edge extracting process described below can also be referred to as a partial image.

Figure 8:
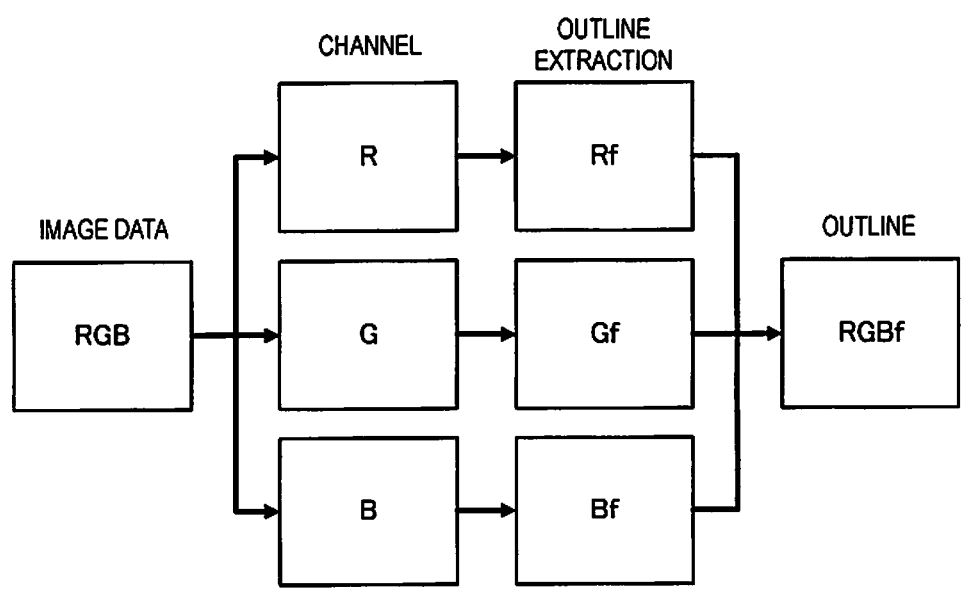
FIG. 8 is a conceptual diagram of an edge extracting process.

FIG. 8 is a conceptual diagram of the edge extracting process. In the edge extracting process, first, the RGB image data (R, G, B) is decomposed into red (R), green (G), and blue (B) channels, and edge pixels (Rf, Gf, Bf) are extracted for each channel. Next, in each channel, the pixels at the positions where it has been determined there are edge pixels, are merged, and the result is extracted as edge pixels (outline RGBf) of the partial image.

FIG. 9 is a matrix illustrating calculation target pixels when performing the edge extracting process for each channel. The edge extracting process uses a target pixel (pixel of interest) for determining whether a pixel is an edge pixel, and image data (gradation values) of four pixels within 3×3 pixels in the periphery of the target pixel. In the 3×3 pixels illustrated in FIG. 9, pixel 0 is the pixel of interest, and pixels 2, 4, 5, 7 are calculation target pixels for determination. The determination of whether the pixel is an edge pixel is determined by the difference between the gradation value of the pixel of interest 0 and the gradation value of the peripheral pixels 2, 4, 5, 7. When the difference in gradation values between the pixel of interest 0 and the pixel of any one of the pixels 2, 4, 5, 7 surpasses a predetermined threshold, and when the gradation value (concentration) of the pixel of interest 0 is greater than the gradation value of the peripheral pixel that has surpassed the predetermined threshold, the pixel of interest 0 is determined to be an edge pixel.

The predetermined threshold during determination of the edge pixel may be a suitable value set in advance, or may be changed by designation via a user (the user of the printing apparatus 1, image processing device 110, or the like). The designation by the user can be input from the input unit 112 via a user interface screen (UI screen) displayed on the display 113 as a function of the printer driver, for example.

Figure 11:
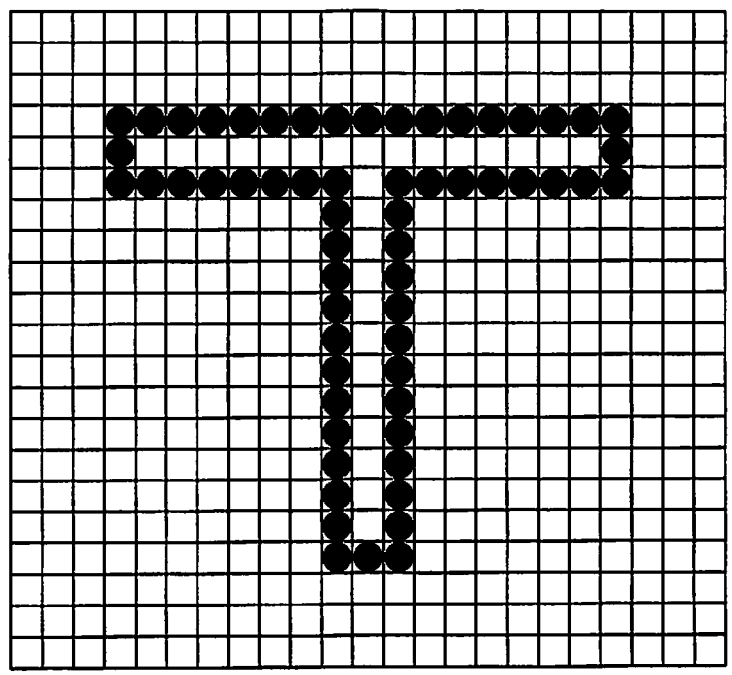
FIG. 11 is a matrix illustrating an example of extracted edge pixels.

FIG. 10 is a matrix illustrating an example of gradation values of the calculation target pixels. When the determination threshold is set to 90, for example, the difference between the gradation value 120 of the pixel of interest 0 and the gradation value 25 of the peripheral pixel 2 is 95, and thus it is determined that the pixel of interest 0 is an edge pixel. FIG. 11 is a matrix illustrating an example of extracted edge pixels for the partial image illustrated in FIG. 5. The positions indicated by the black circles illustrate the positions of the edge pixels.

The edge extracting process is not limited to the method described above, as long as the method is for performing determination based on the degree of difference, distribution, etc. of gradation values. For example, a method may be used whereby calculation is performed while targeting eight pixels in the periphery of the pixel of interest 0, or a method may be used whereby determination is performed based on the degree of inclination of change in gradation values in a wider range.

Working Liquid Mask Process

The working liquid mask process performs masking to prevent clear ink (CL) from being discharged on a region ("first pixel region" in the disclosure) including pixel positions adjacent to the outer side of the edge pixels and pixel positions overlapping the extracted edge pixels. Here, "outer side of the edge pixels" means outside of the outline of the partial image formed by the edge pixels. In other words, the first pixel region is a region including pixel positions adjacent to the outer side of the outline of the partial image formed by the edge pixels and pixel positions overlapping the edge pixels. Furthermore, in one exemplary embodiment, the working liquid is the clear ink (CL), which is the "second ink", and masking refers to configuring the print data such that the working liquid (clear ink (CL)) is not discharged.

Specifically, first, the pixel positions adjacent to the outer side of the edge pixels and pixel positions overlapping the edge pixels are found from information about the positions of the edge pixels extracted by the edge extracting process, and such pixel positions are confirmed as a region (first pixel region) of a mask target (target for performing the outline maintenance process). Next, among the clear ink (CL) halftone data obtained by the halftone process described above, data of the first pixel region (the 1-bit data indicating two gradations (dot present, dot absent), the 2-bit data indicating four gradations (dot absent, small dot, medium dot, large dot), or the like) is replaced with data indicating "dot absent".

Figure 12:
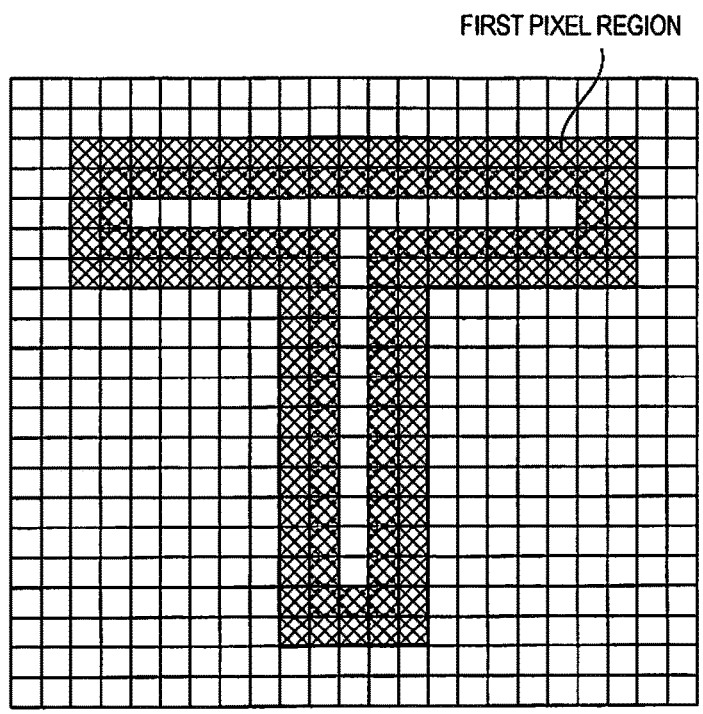
FIG. 12 is a matrix illustrating a first pixel region obtained from the edge pixels.
Figure 13:
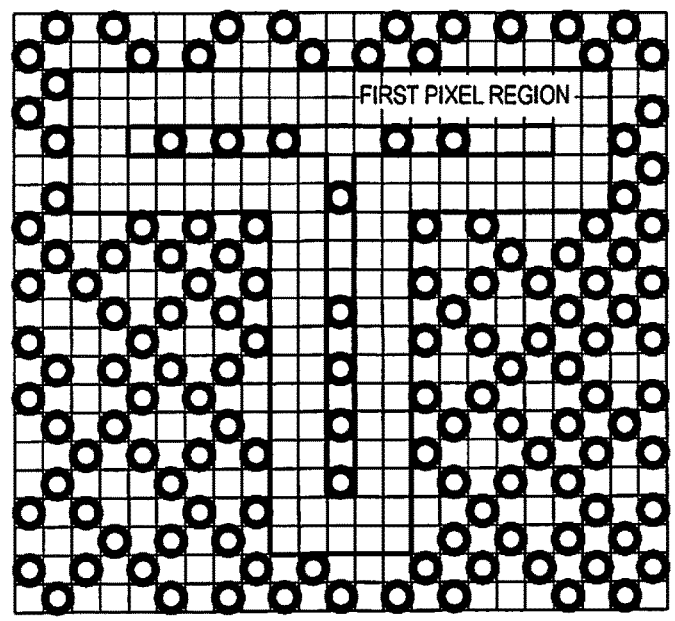
FIG. 13 is a matrix illustrating dot formation positions resulting from using a mask on the first pixel region.

FIG. 12 is a matrix illustrating the first pixel region obtained from the edge pixels illustrated in FIG. 11. In FIG. 12, in contrast to the edge pixels that are illustrated by the dashed circles, hatching is used to illustrate the first pixel region including the pixel positions adjacent to the outer side of the edge pixels and the pixel positions overlapping the edge pixels. FIG. 13 is a matrix illustrating dot formation positions resulting from using a mask on the first pixel region via the working liquid mask process performed on the clear ink (CL) dot formation positions illustrated in FIG. 6. The dots of the clear ink (CL) are not formed in the first pixel region, and thus the outline of the partial image formed by the color ink discharged on this region is not disordered.

Figure 14:
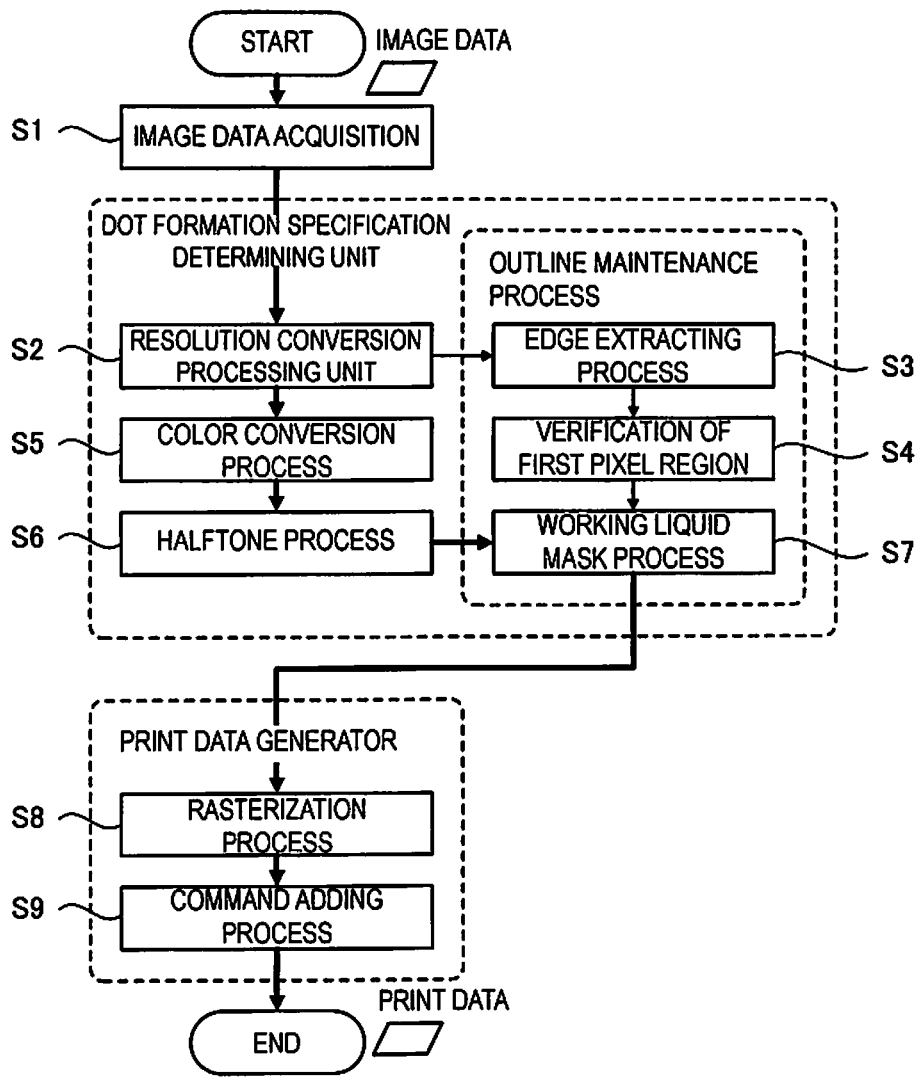
FIG. 14 is a flow chart illustrating the flow of image processing of Exemplary Embodiment 1.

FIG. 14 is a flow chart illustrating the flow of image processing in one exemplary embodiment. The image processing method in one exemplary embodiment, or namely, the generation method of the print data based on the image data, will be described while following the flow chart. First, image data (RGB data) for printing is acquired (step S1). Next, the image data is converted into a resolution (printing resolution) for printing on the roll paper 5 (step S2). Next, based on the image data for which the resolution conversion process has been completed, the edge extracting process of the partial image is performed, and the edge pixels (outline RGBf (refer to FIG. 8)) of the partial image are found (step S3, edge extracting step). At such time, the predetermined threshold for performing determination of the edge pixels can be changed as necessary. Next, the pixel positions adjacent to the outer side of the edge pixels and pixel positions overlapping the edge pixels are found from information about the positions of the extracted edge pixels, and confirmed as a first pixel region (maintenance target region) of a mask target (step S4).

Next, the color conversion process is performed on the image data for which the resolution conversion process has been completed in step S2 and on the image data corresponding to the application of the clear ink (CL), and CMYK image data is obtained (step S5). The pixel data corresponding to the application of the clear ink (CL) designates the printing specifications (type of roll paper 5, print quality, etc.) during printing, thus obtaining image data with a pre-set clear ink (CL) application density.

Next, the halftone process is performed on the CMYK image data, and halftone data is generated indicating the dot formation specifications including the positions at which the dots are to be formed and the sizes of the dots (step S6 (halftone processing step)). The CMYK image data includes pixel data of 256 gradations (a predetermined number of gradations), for example, and as described above, the halftone data includes pixel data of a lower number of gradations than the predetermined number of gradations of the dot formation specifications (such as 1-bit data indicating two gradations (dot present or absent), 2-bit data indicating four gradations (dot absent, small dot, medium dot, large dot), or the like). Next, among the halftone data of the clear ink (CL) obtained in the halftone process, data of the first pixel region is replaced with bit data indicating "dot absent" (step S7 (working liquid mask processing step)). The steps from step S2 to step S7 are "dot formation specification determining steps" for determining, based on the image data, dot formation specifications including the positions at which the dots are to be formed and the sizes of the dots.

Next, the rasterization process is performed on the halftone data (step S8), and finally the command adding process is performed and print data is generated (step S9), thus ending the processing. The steps of step S8 and step S9 are "print data generating steps" for generating print data based on the dot formation specifications.

Step S6 (the halftone processing step) and step S7 (the working liquid mask processing step) were described as separate steps, or namely, it was described that step S7 (the working liquid mask processing step) is performed after step S6 (the halftone processing step), but a method may be used whereby the halftone data is generated while performing the working liquid mask process. Specifically, a method may be used whereby, when performing the halftone process on each of the pixels in the CMYK image data in accordance with the dot generation rate table, halftone data is generated while converting the pixels corresponding to the first pixel region into bit data indicating "dot absent" (in other words, while performing conversion such that the dot generation rates for the pixels corresponding to the first pixel region become 0).

As described above, the image processing device, printing apparatus, image processing method, and image processing program according to some of the exemplary embodiments make it possible to achieve the effects described below.

The image processing device 110 in some of the exemplary embodiments generates the print data based on the image data corresponding to the print image, the print data being for causing execution of printing by the printing apparatus 1 for printing the print image by discharging the color ink on the roll paper 5 and the clear ink (CL) that promotes the spreading of the color ink on the roll paper 5 to form the plurality of dots. Furthermore, the image processing device 110 is provided with the edge extracting unit that, based on the image data, extracts edge pixels forming the outline of the partial image contained in the print image, the dot formation specification determining unit that, based on the image data, determines the positions at which the dots are to be formed and the sizes of the dots, and a print data generator that generates print data based on the dot formation specifications. In addition, the dot formation specification determining unit includes a halftone processing unit that converts the pixel data of the predetermined number of gradations contained in the image data and the pixel data of the predetermined number of gradations corresponding to the application of the clear ink (CL) into halftone data of a lower number of gradations than the predetermined number of gradations of the dot formation specifications.

In such a configuration, among the halftone data corresponding to the clear ink (CL) (in other words, the halftone data determining the formation positions and sizes of the clear ink (CL) dots discharged by the printing apparatus 1), the dot formation specification determining unit converts the halftone data corresponding to the first pixel region including the pixel positions adjacent to the outer side of the edge pixels and pixel positions overlapping the edge pixels extracted by the edge extracting unit into data that does not form dots. Here, the first pixel region is a region where the dots (ink droplets) of the color ink forming the outline of the partial image contained in the print image contact the dots (ink droplets) of the clear ink (CL), or a region where the rate of such contact is high. In one exemplary embodiment, print data is generated such that the printing apparatus 1 is controlled so as not to discharge the clear ink (CL) in this first pixel region. Thus, the dots (ink droplets) of the color ink forming the outline of the partial image contained in the print image will not contact the dots (ink droplets) of the clear ink (CL). Alternatively, the rate of such contact will be low. This results in an even lower degree of the outline of the partial image contained in the print image being disordered.

Meanwhile, the second pixel region is a region contacting the first pixel region, or namely, a region outside the pixel region in which the edge pixels forming the outline of the partial image contained in the print image are contained. Print data is generated such that the clear ink (CL) will be applied to this second pixel region. Thus, the dots (ink droplets) of the color ink have the spreading promoted by the predetermined effects of the clear ink (CL) in contact with the dots (ink droplets) of the color ink, thus forming a favorable image (predetermined image).

In other words, according to the image processing device 110 of some of the exemplary embodiments, in the region outside the pixel region in which the edge pixels forming the outline of the partial image contained in the print image are contained, the color ink is wet-spread by the predetermined effects of the clear ink (CL), thus forming a favorable image, while in the edge pixels forming the outline of the partial image, the degree to which the dots (ink droplets) of the color ink spread is reduced, thus forming a favorable image (partial image) in which disordering of the outline has been suppressed. As a result, even in the case where the print image contains, as a partial image, a small character or fine line, for example, it is possible to perform printing with better visibility.

Furthermore, the dot formation specification determining unit converts the halftone data of the clear ink (CL) corresponding to the pixels of the first pixel region into data that does not form dots, or in other words, the data of the dot formation specifications for forming dots where clear ink (CL) is actually to be formed is converted into a specification whereby dots are not formed, and therefore it is possible to generate print data that provides more reliable and suitable effects.

Moreover, the printing apparatus 1 in some of the exemplary embodiments includes the image processing device 110. Accordingly, the printing apparatus 1 of some exemplary embodiments performs printing based on print data generated by the image processing device 110, which makes it possible to form a favorable image that suppresses disordering of the outline of the partial image contained in the print image. For example, even in the case where the print image contains, as a partial image, a small character or fine line, for example, it is possible to perform printing with better visibility.

In addition, the image processing method in some of the exemplary embodiments generates the print data based on the image data corresponding to the print image, the print data being for causing execution of printing by the printing apparatus 1 for printing the print image by discharging the color ink on the roll paper 5 and the clear ink (CL) that promotes the spreading of the color ink on the roll paper 5 to form the plurality of dots. The image processing method also includes an edge extracting step for extracting, based on the image data, edge pixels forming the outline of the partial image contained in the print image, a dot specification determining step for determining, based on the image data, the positions at which the dots are to be formed and the sizes of the dots, and a print data generating step for generating print data based on the dot formation specifications. Furthermore, the dot formation specification determining step includes a halftone processing step for converting the pixel data of the predetermined number of gradations contained in the image data and the pixel data of the predetermined number of gradations corresponding to the application of the clear ink (CL) into halftone data of a lower number of gradations than the predetermined number of gradations of the dot formation specifications.

In such an image processing method, among the halftone data corresponding to the clear ink (CL) (in other words, the halftone data determining the formation positions and sizes of the clear ink (CL) dots discharged by the printing apparatus 1), the dot formation specification determining step converts the halftone data corresponding to the first pixel region including the pixel positions adjacent to the outer side of the edge pixels and pixel positions overlapping the edge pixels extracted in the edge extracting step into data that does not form dots. In the image processing method of one exemplary embodiment, the print data is generated such that the printing apparatus 1 is controlled so as not to discharge the clear ink (CL) in the first pixel region (a region where the dots (ink droplets) of the color ink forming the outline of the partial image contained in the print image contact the dots (ink droplets) of the clear ink (CL), or in a region where the rate of such contact is high). Thus, the dots (ink droplets) of the color ink forming the outline of the partial image contained in the print image will not contact the dots (ink droplets) of the clear ink (CL). Alternatively, the rate of such contact will be low. This results in an even lower degree of the outline of the partial image contained in the print image being disordered.

Meanwhile, in the image processing method of one exemplary embodiment, print data is generated such that the clear ink (CL) will be discharged on the second pixel region contacting the first pixel region. Thus, the dots (ink droplets) of the color ink have the spreading promoted by the predetermined effects of the clear ink (CL) in contact with the dots (ink droplets) of the color ink, thus forming a favorable image (predetermined image).

In other words, in the image processing method of one exemplary embodiment, in the region outside the pixel region in which the edge pixels forming the outline of the partial image contained in the print image are contained, the color ink is wet-spread by the predetermined effects of the clear ink (CL), thus forming a favorable image, while in the edge pixels forming the outline of the partial image, the degree to which the dots (ink droplets) of the color ink spread is reduced, thus forming a favorable image (partial image) in which disordering of the outline has been suppressed. As a result, even in the case where the print image contains, as a partial image, a small character or fine line, for example, it is possible to perform printing with better visibility.

Furthermore, in the dot formation specification determining step, the halftone data of the clear ink (CL) corresponding to the pixels of the first pixel region is converted into data that does not form dots, or in other words, the data of the dot formation specifications for forming dots where clear ink (CL) is actually to be formed is converted into a specification whereby dots are not formed, and therefore it is possible to generate print data that provides more reliable and suitable effects.

Furthermore, in the image processing program of some exemplary embodiments (in other words, a program that enables execution of the process for generating the print data in the image processing device 110, or a program that enables execution of the process for generating the print data in the image processing method described above), the print data can be generated for causing execution of printing by the printing apparatus 1 for printing the print image by discharging the color ink on the roll paper 5 and the clear ink (CL) that promotes the spreading of the color ink on the roll paper 5 to form the plurality of dots, such that there is an even lower degree of the outline of the partial image contained in the print image being disordered.

Note that the disclosure is not limited to the exemplary embodiments described above, and various changes and modifications may be applied to the exemplary embodiments described above. Modified examples will be described below. Here, the components that are identical to those in the exemplary embodiments described above are referenced using like numbers, and duplicate descriptions are omitted.

Modified Example 1

In Exemplary Embodiment 1, it was described that among the halftone data corresponding to the clear ink (CL), the dot formation specification determining unit converts the halftone data corresponding to the first pixel region (the region including the pixel positions adjacent to the outer side of the edge pixels and pixel positions overlapping the edge pixels extracted by the edge extracting unit) into data that does not form dots. In other words, after the halftone data corresponding to the clear ink (CL) was generated, the print data was generated by a method where a working liquid mask process is performed so that the clear ink (CL) is not discharged on the first pixel region (refer to FIG. 14), but the disclosure is not limited to this method. For example, a method may be used whereby, before performing the halftone process, or in other words, after the color conversion process, a conversion is performed to set the gradation values of the clear ink (CL) in the image data to 0.

Figure 15:
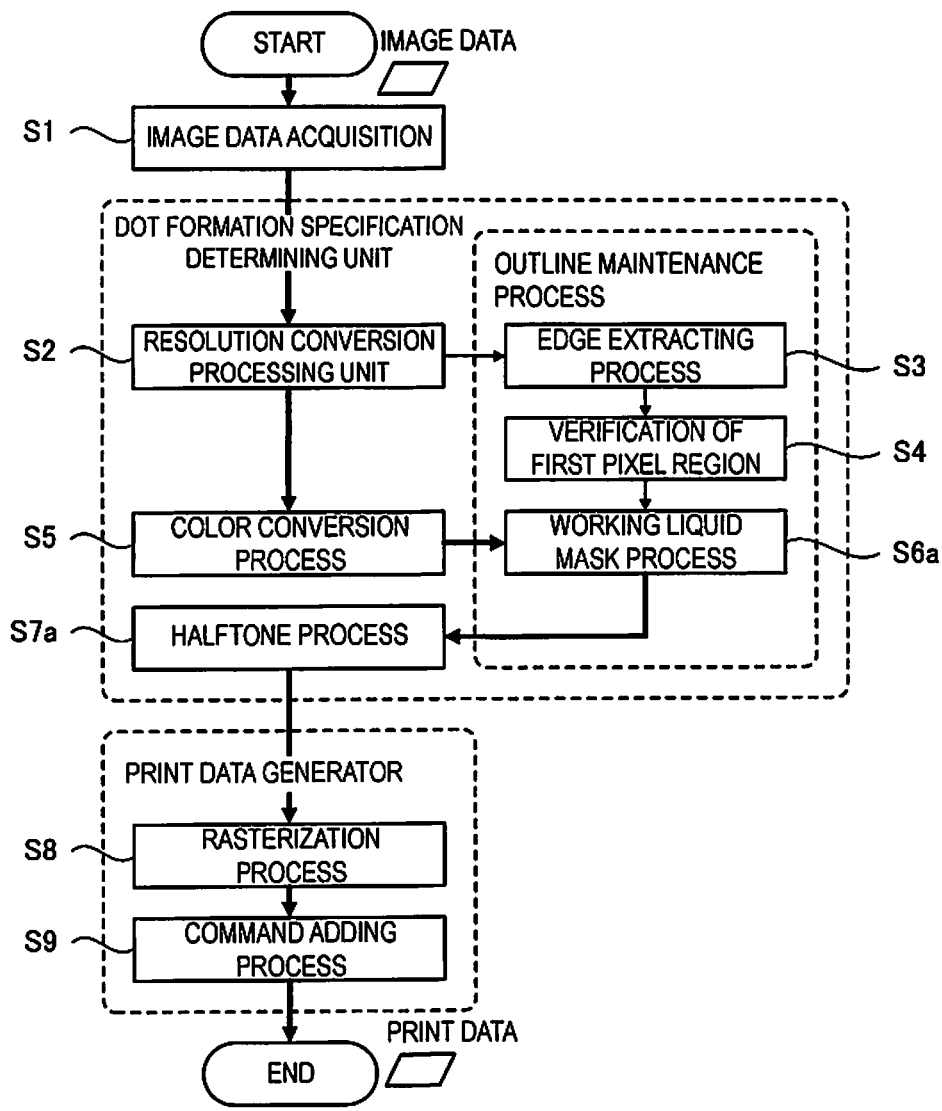
FIG. 15 is a flow chart illustrating the flow of image processing of Modified Example 1.

FIG. 15 is a flow chart illustrating the flow of image processing in Modified Example 1. From step S1 to step S5, the method is identical to the image processing method in Exemplary Embodiment 1. The processes up to step S5 provide CMYK image data that determines the pre-set clear ink (CL) application density (predetermined number of gradations). Next, among the pixel data of the predetermined number of gradations corresponding to the application of this clear ink (CL), the dot formation specification determining unit (in the dot formation specification determining step) converts pixel data corresponding to the first pixel region into data that does not form dots (gradation value=0) (step S6a (working liquid mask processing step)). Next, the halftone process is performed on the CMYK image data, and halftone data is generated indicating the dot formation specifications including the positions at which the dots are to be formed and the sizes of the dots (step S7a (halftone processing step)). The subsequent processes (steps S8, S9) are identical to the image processing method in Exemplary Embodiment 1.

In Modified Example 1, among the pixel data of the predetermined number of gradations corresponding to the application of the clear ink (CL), the dot formation specification determining unit (in the dot formation specification determining step) converts pixel data corresponding to the first pixel region into data that does not form dots. Even with such a method, or in other words, even with a method performed before the pixel data of the predetermined number of gradations corresponding to the application of the clear ink (CL) is converted to halftone data of a lower number of gradations than the predetermined number of gradations of the dot formation specifications, the print data is still generated such that the printing apparatus 1 is controlled so as not to discharge the clear ink (CL) in the first pixel region (a region where the dots (ink droplets) of the color ink forming the outline of the partial image contained in the print image contact the dots (ink droplets) of the clear ink (CL), or a region where the rate of such contact is high). Thus, the dots (ink droplets) of the color ink forming the outline of the partial image contained in the print image will not contact the dots (ink droplets) of the clear ink (CL). Alternatively, the rate of such contact will be low. This results in an even lower degree of the outline of the partial image contained in the print image being disordered.

Modified Example 2

As illustrated in FIG. 13, in Exemplary Embodiment 1, it was described that print data is generated such that the printing apparatus 1 is controlled so as not to discharge clear ink (CL) in the first pixel region, but the disclosure is not limited to this configuration (method), and it is possible to use a configuration (method) that reduces the application density of the clear ink (CL) discharged on the first pixel region. Application density means the proportion of area with dots formed per unit area. In the image processing device 110 of Modified Example 2, the dot formation specification determining unit determines the dot formation specifications such that the application density of the clear ink (CL) discharged on the first pixel region including the pixel positions adjacent to the outer side of the edge pixels and pixel positions overlapping the edge pixels extracted by the edge extracting unit is less than the application density of the clear ink (CL) discharged on the second pixel region contacting the first pixel region. Except for this point, the image processing device 110 of Modified Example 2 is identical to the image processing device 110 of Exemplary Embodiment 1. The "method whereby the clear ink (CL) is discharged on the second pixel region, and the clear ink (CL) is not discharged on the first pixel region" in Exemplary Embodiment 1 can be regarded as one example of the "method whereby the application density of the clear ink (CL) discharged on the first pixel region is less than the application density of the clear ink (CL) discharged on the second pixel region" in Modified Example 2.

In Modified Example 2, the method of reducing the application density of the clear ink (CL) includes a method of reducing the size of the ink droplets of the clear ink (CL) (reducing the dot diameter), and a method of reducing the discharge density of the ink droplets of the clear ink (CL). The method of reducing the size of the ink droplets of the clear ink (CL) (reducing the dot diameter) is a method of converting to smaller dots when the halftone data includes 2-bit or higher data indicating a plurality of dot sizes such as four gradations (dot absent, small dot, medium dot, large dot), for example.

One method of converting to smaller dots is to generate the halftone data corresponding to the clear ink (CL), and then convert the dot sizes (ink droplet sizes) of the clear ink (CL) to be discharged on the first pixel region into data of smaller sizes. In other words, the halftone data of the clear ink (CL) contained in the first pixel region is changed to a dot diameter that is one size (or two sizes) smaller. Making a small dot one size smaller, or making a medium dot two sizes smaller, each change the size to "dot absent". This type of process is performed in the working liquid mask processing unit (working liquid mask processing step) described in Exemplary Embodiment 1. Accordingly, in Modified Example 2, masking means setting the print data such that the size of the working liquid (clear ink (CL)) to be discharged is smaller.

As another example of a method of converting to smaller dots, before performing the halftone process, or in other words, after the color conversion process, a conversion is performed to set the gradation values of the clear ink (CL) in the CMYK image data to smaller values. Specifically, for example, in the CMYK image data after the color conversion process, the pixel data corresponding to the first pixel region among the pixel data of the predetermined number of gradations corresponding to the application of the clear ink (CL) is converted to a smaller number of gradations (half the number, for example).

The method of reducing the discharge density of the ink droplets of the clear ink (CL) refers to a method in which print data is generated such that the printing apparatus 1 is controlled so the discharge density of the ink droplets of the clear ink (CL) discharged on the first pixel region is less than the discharge density of the ink droplets of the clear ink (CL) discharged on the second pixel region. In other words, the method reduces the number of discharges of clear ink (CL) discharged at random positions on the first pixel region.

The method of reducing the application density of the clear ink (CL) may be a method that combines the method of reducing the size of the ink droplets of the clear ink (CL) (reducing the dot diameter) and the method of reducing the discharge density of the ink droplets of the clear ink (CL). Specifically, this method converts the dot sizes (ink droplet sizes) of the clear ink (CL) discharged on the first pixel region to smaller dots while lowering the discharge density of the ink droplets of the clear ink (CL).

There are cases in which the degree of disordering of the outline of the partial image differs due to the specifications of the roll paper 5, and thus the method of reducing the application density of the clear ink (CL) discharged on the first pixel region, or the degree, may be set in advance under sufficient evaluation so as to be a suitable specification corresponding to the specifications of each roll paper 5. Furthermore, the allowable level for the degree to which the outline of the partial image is disordered differs depending on the type or purpose of the partial image, the preferences of the user (the user of the printing apparatus 1 or image processing device 110) etc., and thus the allowable level may be set to be changeable by user designation. The designation by the user can be input from the input unit 112 via the user interface screen (UI screen) displayed on the display 113 as a function of the printer driver, for example.

In the image processing device 110 (image processing method) of Modified Example 2, print data is generated such that the application density of the clear ink (CL) in the first pixel region is reduced. Thus, even in a case in which the dots (ink droplets) of the color ink and the dots (ink droplets) of the clear ink (CL) contact each other, the degree to which the dots (ink droplets) of the color ink are affected by the dots (ink droplets) of the clear ink (CL) is reduced (namely, the degree to which the dots (ink droplets) spread is reduced). This results in an even lower degree of the outline of the partial image contained in the print image being disordered.

Modified Example 3

In Modified Example 2, it was described that the dot formation specification determining unit determines the dot formation specifications such that the application density of the clear ink (CL) discharged on the first pixel region is less than the application density of the clear ink (CL) discharged on the second pixel region contacting the first pixel region. Furthermore, it was described that the degree to which the application density of the clear ink (CL) discharged on the first pixel region is reduced may be set in advance as a suitable specification corresponding to the specifications of each roll paper 5. In other words, it was described that the change in the degree of the application density of the clear ink (CL) is with respect to the entirety of the first pixel region. In Modified Example 3, in order to enable even more suitable printing, in the image processing device 110, the dot formation specification determining unit determines the degree to which the application density is reduced based on the halftone data of the color ink corresponding to the edge pixels. This will be described in detail below.

Figure 16:
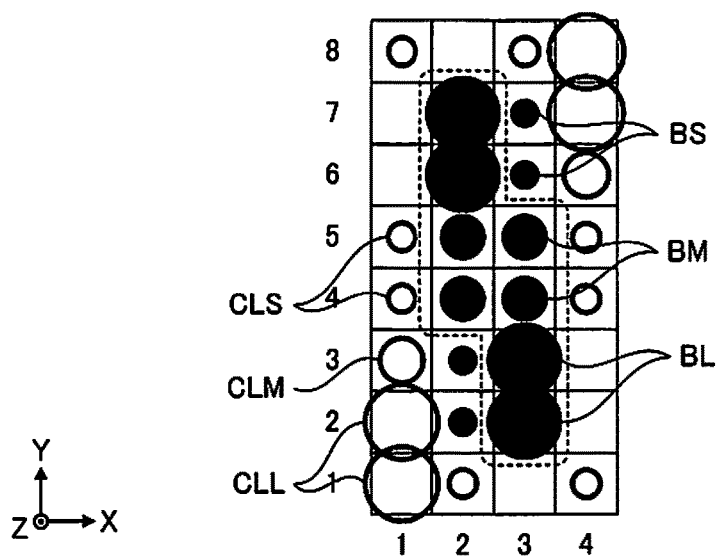
FIG. 16 is a dot matrix for explaining an image processing method according to Modified Example 3.

FIG. 16 is a dot matrix for describing an image processing method performed by the image processing device 110 of Modified Example 3. In FIG. 16, the black circles are black ink (K) dots forming a partial image and include three types: large dots BL, medium dots BM, and small dots BS. The white circles are clear ink (CL) dots discharged on the first pixel region and include three types: large dots CLL, medium dots CLM, and small dots CLS. Here, for example, among the black ink (K) dots, the large dots BL and medium dots BM are extracted as edge pixels by a predetermined threshold for extracting edge pixels. In this case, the edge pixels are the pixels inside the dashed line illustrated in FIG. 16, and the first pixel region is a region including pixel positions adjacent to the edge pixels and pixel positions overlapping the edge pixels, and thus in the 4×8 matrix, the region except for the four pixels of (x,y)=(1,1), (1,2), (4,7), and (4,8) serve as the first pixel region.

In the image processing method of Modified Example 3, the dot sizes of the clear ink (CL) discharged on the pixel positions adjacent to the edge pixels (in other words, the degree to which the application density is reduced) are determined in accordance with the dot sizes of the color ink pixels exceeding the predetermined threshold and extracted as edge pixels (in other words, based on the halftone data of the color ink corresponding to the edge pixels).

As a specific example, the clear ink (CL) is not applied on pixel positions overlapping the large dots BL and medium dots BM, or on pixel positions adjacent to the large dots BL in the X or Y direction. Furthermore, in the pixel positions adjacent to diagonal positions of the large dots BL in the X or Y direction, and in the pixel positions adjacent to the medium dots BM in the X or Y direction, the dot sizes of the clear ink (CL) are set to be small dots CLS. In addition, in the pixel positions adjacent to diagonal positions of the medium dots BM in the X or Y direction, the dot sizes of the clear ink (CL) are set to be medium dots CLM. In the pixel positions of the second pixel region, clear ink (CL) of large dots CLL is applied.

The dot matrix illustrated in FIG. 16 illustrates a printed image applied by this method. As can be understood from FIG. 16, the dot sizes of the clear ink (CL) discharged on the pixel positions adjacent to the edge pixels (in other words, the degree to which the application density is reduced) being determined in accordance with the dot sizes of the color ink pixels exceeding the predetermined threshold and extracted as edge pixels (in other words, based on the halftone data of the color ink corresponding to the edge pixels) eliminates contact between the dots (ink droplets) of the black ink (K) and the dots (ink droplets) of the clear ink (CL). Alternatively, the rate of such contact will be low.

In the Modified Example 3, the dot formation specification determining unit determines the degree to which the application density of the clear ink (CL) applied on the first pixel region is reduced based on the halftone data of the color ink corresponding to the edge pixels. As a result, it is possible to more suitably reduce a degree of the effect the dots (ink droplets) of the clear ink (CL) have on the dots (ink droplets) of the color ink.

Modified Example 4

Figure 17:
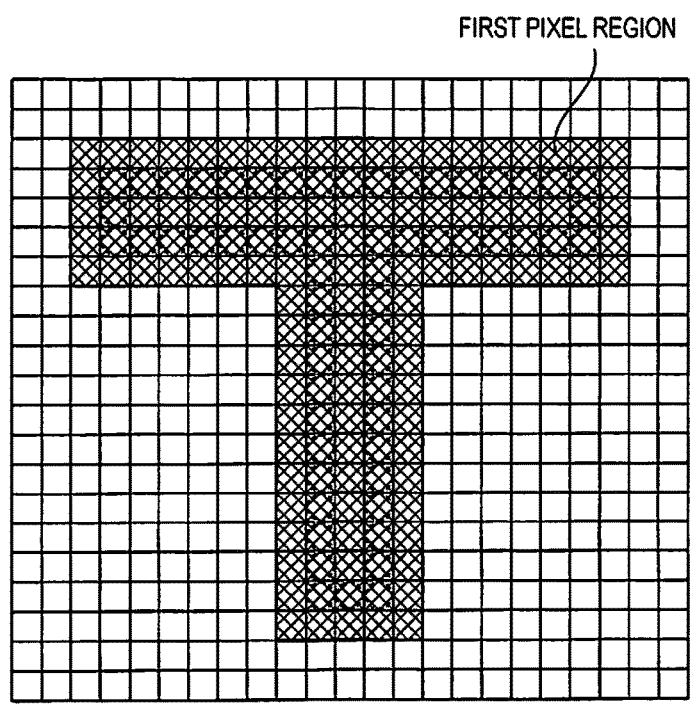
FIG. 17 is a matrix illustrating a first pixel region obtained from the edge pixels in Modified Example 4.
Figure 18:
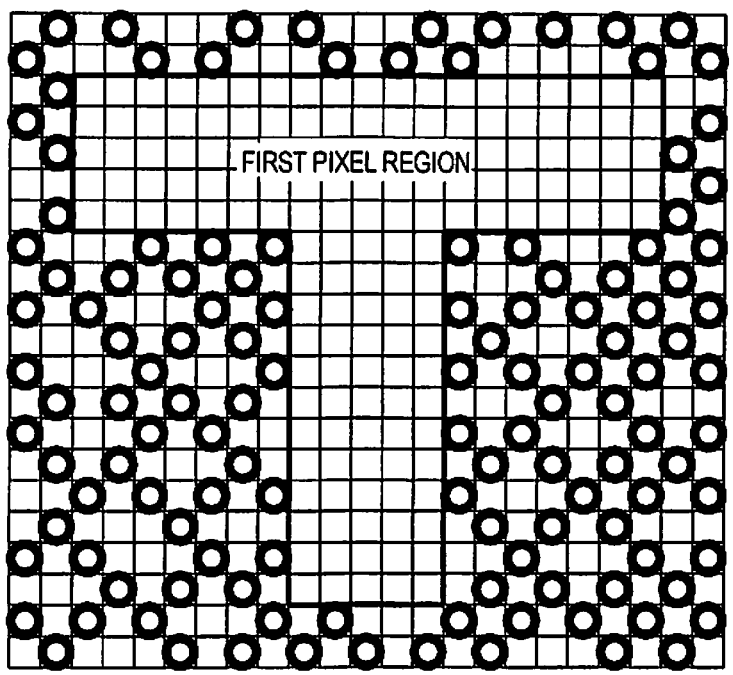
FIG. 18 is a matrix illustrating dot formation positions resulting from using a mask on the first pixel region in Modified Example 4.

In Exemplary Embodiment 1, as illustrated in FIG. 12, it was described that the first pixel region is a region including pixel positions adjacent to the outer side of the outline of the partial image formed by the edge pixels and pixel positions overlapping the edge pixels, but a region including pixel positions adjacent to the inner side of the outline of the partial image including the edge pixels may be added to the first pixel region. FIG. 17 is a matrix illustrating the first pixel region of Modified Example 1 obtained from the edge pixels illustrated in FIG. 11. In FIG. 17, in contrast to the edge pixels that are illustrated by the dashed circles, hatching is used to illustrate the first pixel region including the pixel positions adjacent to the outer side of the edge pixels and the pixel positions overlapping the edge pixels. FIG. 18 is a matrix illustrating dot formation positions resulting from using a mask on the first pixel region via the working liquid mask process performed on the clear ink (CL) dot formation positions illustrated in FIG. 6. The first pixel region does not have the dots of the clear ink (CL) formed in the first pixel region, and thus the outline of the partial image formed by the color ink discharged on this region is not disordered.

This application claims priority under 35 U.S.C. § 119 to Japanese Patent Application No. 2017-130885, filed Jul. 4, 2017. The entire disclosure of Japanese Patent Application No. 2017-130885 is hereby incorporated herein by reference.

What is claimed is:

1. An image processing device, comprising:
   at least one processor configured to execute a plurality of units including
      an edge extracting unit configured to, based on image data corresponding to a print image, extract edge pixels forming an outline of a partial image contained in the print image;
      a dot formation specification determining unit configured to, based on the image data, determine dot formation specifications including positions at which a plurality of dots are to be formed and sizes of the plurality of dots; and
      a print data generator configured to, based on the dot formation specifications, generate print data for causing execution of printing by a printing apparatus for printing the print image by discharging first ink on a printing medium and second ink that promotes spreading of the first ink on the printing medium to form the plurality of dots, wherein
   the dot formation specification determining unit determines the dot formation specifications such that an application density of the second ink discharged on a first pixel region, including at least pixel positions, which are adjacent to an outer side of the edge pixels and do not overlap the partial image, and pixel positions overlapping the edge pixels extracted by the edge extracting unit, is less than an application density of the second ink discharged on a second pixel region contacting the first pixel region.

2. The image processing device according to claim 1, wherein
   the dot formation specification determining unit includes a halftone processing unit configured to convert pixel data of a predetermined number of gradations contained in the image data, and pixel data of a predetermined number of gradations corresponding to application of the second ink, into halftone data of a lower number of gradations than the predetermined number of gradations of the dot formation specifications, and
   the dot formation specification determining unit, among the halftone data corresponding to the second ink, performs conversion to reduce the application density on the halftone data corresponding to the first pixel region.

3. The image processing device according to claim 2, wherein
   the dot formation specification determining unit determines a degree to which the application density is reduced based on the halftone data of the first ink corresponding to the edge pixels.

4. The image processing device according to claim 1, wherein
   the dot formation specification determining unit includes a halftone processing unit configured to convert pixel data of a predetermined number of gradations contained in the image data, and pixel data of a predetermined number of gradations corresponding to application of the second ink, into halftone data of a lower number of gradations than the predetermined number of gradations of the dot formation specifications, and
   the dot formation specification determining unit, among the pixel data of the predetermined number of gradations corresponding to the application of the second ink, performs conversion to reduce the application density on the pixel data corresponding to the first pixel region.

5. The image processing device according to claim 1, wherein
   the dot formation specification determining unit includes a halftone processing unit configured to convert pixel data of a predetermined number of gradations contained in the image data, and pixel data of a predetermined number of gradations corresponding to application of the second ink, into halftone data of a lower number of gradations than the predetermined number of gradations of the dot formation specifications, and
   the dot formation specification determining unit, among the halftone data corresponding to the second ink, converts the halftone data corresponding to the first pixel region into data that does not form the dots.

6. The image processing device according to claim 1, wherein
   the dot formation specification determining unit includes a halftone processing unit configured to convert pixel data of a predetermined number of gradations contained in the image data, and pixel data of a predetermined number of gradations corresponding to application of the second ink, into halftone data of a lower number of gradations than the predetermined number of gradations of the dot formation specifications, and
   the dot formation specification determining unit, among the pixel data of the predetermined number of gradations corresponding to the second ink, converts the pixel data corresponding to the first pixel region into data that does not form the dots.

7. A printing apparatus, comprising an image processing device,
   the image processing device comprising at least one processor configured to execute a plurality of units including
      an edge extracting unit configured to, based on image data corresponding to a print image, extract edge pixels forming an outline of a partial image contained in the print image;

a dot formation specification determining unit configured to, based on the image data, determine dot formation specifications including positions at which a plurality of dots are to be formed and sizes of the plurality of dots; and a print data generator configured to, based on the dot formation specifications, generate print data for causing execution of printing by a printing apparatus for printing the print image by discharging first ink on a printing medium and second ink that promotes spreading of the first ink on the printing medium to form the plurality of dots, wherein the dot formation specification determining unit determines the dot formation specifications such that an application density of the second ink discharged on a first pixel region, including at least pixel positions, which are adjacent to an outer side of the edge pixels and do not overlap the partial image, and pixel positions overlapping the edge pixels extracted by the edge extracting unit, is less than an application density of the second ink discharged on a second pixel region contacting the first pixel region.

8. An image processing method, comprising:

extracting, based on image data corresponding to a print image, edge pixels forming an outline of a partial image contained in the print image;

determining, based on the image data, dot formation specifications including positions at which a plurality of dots are to be formed and sizes of the plurality of dots; and generating, based on the dot formation specifications, print data for causing execution of printing by a printing apparatus for printing the print image by discharging first ink on a printing medium and second ink that promotes spreading of the first ink on the printing medium to form the plurality of dots, wherein the determining determines the dot formation specifications such that an application density of the second ink discharged on a first pixel region, including at least pixel positions, which are adjacent to an outer side of the edge pixels and do not overlap the partial image, and pixel positions overlapping the edge pixels extracted by the extracting, is less than an application density of the second ink discharged on a second pixel region contacting the first pixel region.

9. The image processing method according to claim 8, wherein the determining includes converting pixel data of a predetermined number of gradations contained in the image data, and pixel data of a predetermined number of gradations corresponding to application of the second ink, into halftone data of a lower number of gradations than the predetermined number of gradations of the dot formation specifications, and the determining, among the halftone data corresponding to the second ink, performs conversion to reduce the application density on the halftone data corresponding to the first pixel region.

10. The image processing method according to claim 9, wherein the determining determines a degree to which the application density is reduced based on the halftone data of the first ink corresponding to the edge pixels.

11. The image processing method according to claim 8, wherein the determining includes converting pixel data of a predetermined number of gradations contained in the image data, and pixel data of a predetermined number of gradations corresponding to application of the second ink, into halftone data of a lower number of gradations than the predetermined number of gradations of the dot formation specifications, and the determining, among the pixel data of the predetermined number of gradations corresponding to the application of the second ink, performs conversion to reduce the application density on the pixel data corresponding to the first pixel region.

12. The image processing method according to claim 8, wherein the determining includes converting pixel data of a predetermined number of gradations contained in the image data, and pixel data of a predetermined number of gradations corresponding to application of the second ink, into halftone data of a lower number of gradations than the predetermined number of gradations of the dot formation specifications, and the determining, among the halftone data corresponding to the second ink, converts the halftone data corresponding to the first pixel region into data that does not form the plurality of dots.

13. The image processing method according to claim 8, wherein the determining includes converting pixel data of a predetermined number of gradations contained in the image data, and pixel data of a predetermined number of gradations corresponding to application of the second ink, into halftone data of a lower number of gradations than the predetermined number of gradations of the dot formation specifications, and the determining, among the pixel data of the predetermined number of gradations corresponding to the application of the second ink, converts the pixel data corresponding to the first pixel region into data that does not form the plurality of dots.

14. A non-transitory computer readable medium storing an image processing program for causing a computer to execute a process, the process comprising:

extracting, based on image data corresponding to a print image, edge pixels forming an outline of a partial image contained in the print image;

determining, based on the image data, dot formation specifications including positions at which a plurality of dots are to be formed and sizes of the plurality of dots; and generating, based on the dot formation specifications, print data for causing execution of printing by a printing apparatus for printing the print image by discharging first ink on a printing medium and second ink that promotes spreading of the first ink on the printing medium to form the plurality of dots, wherein the determining determines the dot formation specifications such that an application density of the second ink discharged on a first pixel region, including at least pixel positions, which are adjacent to an outer side of the edge pixels and do not overlap the partial image, and pixel positions overlapping the edge pixels extracted by the extracting, is less than an application density of the second ink discharged on a second pixel region contacting the first pixel region.

* * * * *